United States Patent
Goedhart et al.

(10) Patent No.: US 11,170,187 B2
(45) Date of Patent: Nov. 9, 2021

(54) AUTOMOTIVE COLOR MATCHING SYSTEM AND METHOD

(71) Applicant: THE SHERWIN-WILLIAMS COMPANY, Cleveland, OH (US)

(72) Inventors: Paul Goedhart, Gouda (NL); Klaas De Haas, Warnsveld (NL)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 109 days.

(21) Appl. No.: 16/529,899

(22) Filed: Aug. 2, 2019

(65) Prior Publication Data
US 2021/0034829 A1 Feb. 4, 2021

(51) Int. Cl.
*G06K 7/10* (2006.01)
*G06K 9/46* (2006.01)
(Continued)

(52) U.S. Cl.
CPC ....... *G06K 7/10722* (2013.01); *G06F 16/532* (2019.01); *G06F 16/587* (2019.01);
(Continued)

(58) Field of Classification Search
CPC ............... G06K 7/10722; G06K 9/325; G06K 19/06028; G06K 7/1413; G06K 9/00671;
(Continued)

(56) References Cited

U.S. PATENT DOCUMENTS 6,768,814 B1 7/2004 Spitzer et al.
7,194,361 B2 * 3/2007 Corrigan ................... G01J 3/46
356/402
(Continued)

FOREIGN PATENT DOCUMENTS

EP 1139234 10/2001
WO 2007/018795 2/2007
(Continued)

OTHER PUBLICATIONS

Website, Blog, Blippar, "Turning US Streets into Car Showrooms with Auto Recognition", downloaded from the internet on Oct. 2, 2019 from: https://www.blippar.com/blog/2017/05/25/introducing-automotive-recognition-us-streets-become-car-showroom (7 pgs).
(Continued)

*Primary Examiner* — Ishrat I Sherali

(57) ABSTRACT

The present invention is directed to an automotive color matching system and method that may be implemented on a smartphone or other computing device. The method comprises receiving at least one digital image of a vehicle captured by a camera in communication with a processor of the computing device; analyzing the digital image of the vehicle to determine vehicle information (e.g., the make, model, and/or model year of the vehicle); and determining color information (e.g., a color formula for each of the colors associated with the vehicle information). A final paint color selected from the colors in the color information may be transmitted to a dispenser or scale for application of paint to the vehicle. Various embodiments of the automotive color matching system and method are disclosed.

25 Claims, 32 Drawing Sheets

(51) Int. Cl.
| | |
|---|---|
| *G06F 16/532* | (2019.01) |
| *G06K 9/32* | (2006.01) |
| *G06T 7/90* | (2017.01) |
| *G06K 9/00* | (2006.01) |
| *G06F 16/953* | (2019.01) |
| *G06F 16/587* | (2019.01) |
| *G06F 16/955* | (2019.01) |
| *G06K 7/14* | (2006.01) |
| *G06K 19/06* | (2006.01) |
| *G06F 16/583* | (2019.01) |

(52) U.S. Cl.
CPC ........ *G06F 16/5838* (2019.01); *G06F 16/953* (2019.01); *G06F 16/9554* (2019.01); *G06K 7/1413* (2013.01); *G06K 9/00671* (2013.01); *G06K 9/325* (2013.01); *G06K 19/06028* (2013.01); *G06T 7/90* (2017.01); *G06K 2209/01* (2013.01); *G06T 2207/10024* (2013.01); *G06T 2207/30252* (2013.01)

(58) Field of Classification Search
CPC . G06K 2209/01; G06F 16/587; G06F 16/953; G06F 16/5838; G06F 16/532; G06F 16/9554; G06T 7/90; G06T 2207/10024; G06T 2207/30252
USPC ................................................ 382/100, 162
See application file for complete search history.

(56) References Cited

U.S. PATENT DOCUMENTS

| | | | | |
|---|---|---|---|---|
| 7,337,162 | B2* | 2/2008 | Lewis | G01J 3/463 |
| 7,743,055 | B2* | 6/2010 | Rodrigues | G06F 16/54 |
| | | | | 707/722 |
| 7,860,856 | B2* | 12/2010 | Lewis | G01J 3/46 |
| | | | | 707/708 |
| 8,849,027 | B2* | 9/2014 | Henry | G06T 11/001 |
| | | | | 382/167 |
| 9,245,203 | B2 | 1/2016 | Hofman et al. | |
| 9,292,744 | B2* | 3/2016 | Rodrigues | B05D 5/005 |
| 9,734,590 | B2* | 8/2017 | Prakash | G01J 3/504 |
| 10,306,053 | B1 | 5/2019 | Moeller | |
| 10,796,354 | B1* | 10/2020 | Termeer | G06Q 20/12 |
| 2001/0041966 | A1* | 11/2001 | Corrigan | G01J 3/0264 |
| | | | | 702/32 |
| 2004/0093112 | A1* | 5/2004 | Marchand | G01J 3/463 |
| | | | | 700/123 |
| 2005/0128484 | A1* | 6/2005 | Rodrigues | G06T 11/001 |
| | | | | 356/402 |
| 2012/0230548 | A1* | 9/2012 | Calman | G06K 9/00671 |
| | | | | 382/104 |
| 2020/0089991 | A1* | 3/2020 | Steenhoek | G06K 9/6211 |
| 2021/0201535 | A1* | 7/2021 | Steenhoek | G06T 7/11 |

FOREIGN PATENT DOCUMENTS

| | | | | |
|---|---|---|---|---|
| WO | 2009/144222 | 12/2009 | | |
| WO | 2013/092678 | 6/2013 | | |
| WO | 2013/092679 | 6/2013 | | |
| WO | WO-2013092679 A1 * | 6/2013 | ................ | G01J 3/52 |

OTHER PUBLICATIONS

Paper, I. Budvytis, et al., "Blippar's Car Recognition, Face Recognition and Face Verification Technology Evaluation Report", Nov. 28, 2017, downloaded from the internet on Oct. 2, 2019 from: https://drive.google.com/file/d/1eHSGYu1D-kXRSM3JsLSM8dlVxRMEWTj0/view (10 pgs).

Website, Sighthound, "Cloud API: Facial, Vehicle, & Object Recognition for Developers", downloaded from the internet on Oct. 2, 2019 from: https://www.sighthound.com/products/cloud (5 pgs).

Website, Sighthound, "Recognition API—Face and Vehicle", downloaded from the internet on Oct. 2, 2019 from: https://www.sighthound.com/docs/cloud/recognition/ (9 pgs).

Website, Sighthound, "Computer Vision Software with Deeply-Learned AI Vision API & SDK's Technology", downloaded from the internet on Oct. 2, 2019 from: https://www.sighthound.com/technology/ (4 pgs).

Paper, A. Dehghan et al., "View Independent Vehicle Make, Model and Color Recognition Using Convolutional Neural Network", downloaded from the internet on Oct. 2, 2019 from: https://arxiv.org/pdf/1702.01721.pdf (7 pgs).

Website, Sherwin-Williams Automotive Finishes, "FormulaExpress® 2.0 Online Formula Retrieval System", downloaded from the internet on Oct. 2, 2019 from: https://www.sherwin-automotive.com/refinish/color-tools-information/formula-express-color-retrieval-system (2 pgs).

International Patent Application No. PCT/US2020/043673, filed Jul. 27, 2020, International Search Report dated Sep. 15, 2020, 7 pages.

International Patent Application No. PCT/US2020/043673, filed Jul. 27, 2020, International Written Opinion dated Sep. 15, 2020, 7 pages.

* cited by examiner

AUTOMOTIVE COLOR MATCHING SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Automobile manufacturers use different types of automotive paint finishes, the most common of which is a basecoat/clearcoat finish. A basecoat/clearcoat finish includes a basecoat that provides the desired color and color effect to a vehicle, and then a transparent clearcoat is applied over the basecoat to provide protection for the basecoat and improve the performance (e.g., mechanical properties such as scratch resistance, hardness, etc.) and appearance of the overall finish. A monocoat finish that includes only a basecoat may also be used, or a multilayer finish that includes a clearcoat applied over two or more basecoat finishes.

When a vehicle has been damaged, a significant part of the repair process is ensuring a seamless application of automotive paint to the damaged area of the vehicle without requiring the entire vehicle to be repainted. Auto body paint specialists utilize various means to achieve a match between the aftermarket paint color used to repair the vehicle and the vehicle's original paint finish. For example, some paint specialists perform a visual color assessment to obtain a match, which is time-consuming and requires a certain amount of trial and error in the color selection process. Other paint specialists use technological systems to assist with selection of the best color formula, such as color retrieval systems and spectrophotometers.

A conventional color retrieval system requires a user to manually enter a variety of different types of information relating to a vehicle, and then accesses a color information database to retrieve color results associated with that user-entered information. The functionality of the software used in a color retrieval system is shown in the process flow diagram of FIG. 1. In step 100, a user manually enters vehicle information (e.g., the make, model and/or model year of the vehicle) and color information (e.g., a color code) into the system. In step 102, the system accesses a color information database to retrieve the vehicle colors associated with the entered vehicle and color information. In step 104, a determination is made as to whether the vehicle colors were located and, if not, the process returns to step 100 for manual entry of additional or corrected vehicle and color information. If the vehicle colors were located, the color results are presented to the user in step 106 and, in step 108, the user selects the best color from the color results. In many cases, the user will use physical color chips and/or a coarseness selector (which may be a color swatch with colors having different coarseness values) to make the color selection. In step 110, the system transmits the color formula for the selected color to a dispenser or scale for application of paint to the vehicle.

There are several drawbacks associated with the use of a conventional color retrieval system. For example, the system requires a user to manually enter a relatively large amount of information, which can be time-consuming and prone to human error. Also, the user may not have knowledge of all of the pertinent information, e.g., the user may not know the model year of the vehicle. In addition, the location of the color code is not uniform across all vehicles, and the time spent in locating the color code further adds to the overall time required to perform the color retrieval process. Further, there is no way to distinguish between variants of the same color without the use of color chips. Of course, the use of color chips is not ideal due to the manual nature of the process and, in addition, not all colors in the color information database have a corresponding color chip.

Some auto body paint specialists use a computer-controlled spectrophotometer to determine the color formula that will provide an exact match to the vehicle's original paint finish. A spectrophotometer is a small optical instrument that electronically measures color by, for example, illuminating an unaffected area of the vehicle being repaired with light composed of different wavelengths (either simultaneous or successive illuminations) and records the reflected light for the different wavelengths. The percentage of reflected light for each wavelength in the visual spectrum is used to search a database of color formulas, and the formulas with the lowest color differences are retrieved (or possibly a single color formula is retrieved). While a spectrophotometer provides an accurate means to perform the color matching process, many body shops do not to utilize this instrument due to its relatively high cost. Also, operation of a spectrophotometer requires a certain level of expertise, which may not be available at certain auto body shops. Further, placement of an expensive optical instrument in an auto body shop is not always a desirable option.

Thus, there remains a need in the art for color matching technology that overcomes some or all of the drawbacks associated with conventional color retrieval systems and spectrophotometers and/or that offers other advantages compared to existing technological systems.

BRIEF SUMMARY OF THE INVENTION

The present invention is directed to an automotive color matching system and method that that may be implemented on a smartphone or other computing device. In general terms, the computing device is configured to execute a color matching application that enables selection of an aftermarket paint color to match the color of the vehicle's original paint finish. Preferably, the color formula for the selected paint color is transmitted to a dispenser or scale for application of paint to the vehicle, although the color matching application may also be used with scales that are operated manually.

In a first exemplary embodiment of the invention, the computing device comprises a processor and memory device, wherein the memory device stores instructions that cause the processor to receive one or more digital images of a vehicle captured by a camera in communication with the processor (e.g., the camera of a smartphone or other types of cameras, as described below). The processor determines vehicle information associated with the digital image(s) of the vehicle, e.g., by retrieving vehicle information associated with the vehicle image(s) in a vehicle information database. The processor then determines color information associated with the vehicle information, e.g., by retrieving color information associated with the vehicle information in a color information database. Other information may optionally be used to determine the color information, such as the region of the vehicle ascertained from GPS information received from a GPS receiver, vehicle identification number (VIN) information determined from a VIN or VIN barcode, information received from a color retrieval system, and/or information manually entered by a user. In some embodiments, the processor presents color results comprising all or a portion of the color information, and receives a user selection of a final paint color for the vehicle from the color results. Preferably, the color formula for the final paint color is transmitted to a dispenser or scale for application of paint to the vehicle.

In a second exemplary embodiment of the invention, the computing device comprises a processor and memory device, wherein the memory device stores instructions that cause the processor to receive one or more digital images of a vehicle captured by a camera in communication with the processor (e.g., the camera of a smartphone or other types of cameras, as described below). The processor determines vehicle information (e.g., the make, model, and/or model year of the vehicle) based on an analysis of the digital image(s) of the vehicle. The processor also determines color information (e.g., a color formula for each of the colors associated with the vehicle information). Other information may optionally be used to determine the color information, such as the region of the vehicle ascertained from GPS information received from a GPS receiver, vehicle identification number (VIN) information determined from a VIN or VIN barcode, information received from a color retrieval system, and/or information manually entered by a user. In addition, the processor determines a basic color of the vehicle based on an analysis of the digital image(s) of the vehicle. In some embodiments, the processor presents color results comprising the colors in the color information that are related to the basic color of the vehicle, and receives a user selection of a final paint color for the vehicle from the color results. Preferably, the color formula for the final paint color is transmitted to a dispenser or scale for application of paint to the vehicle.

Various other embodiments and features of the present invention are described in detail below with reference to the attached drawing figures or will be apparent to those skilled in the art based on the disclosure provided herein.

DETAILED DESCRIPTION OF EXEMPLARY EMBODIMENTS

The present invention is directed to an automotive color matching system and method that may be implemented on a smartphone or other computing device to enable selection of an aftermarket paint color that matches the color of the vehicle's original paint finish. While the invention will be described in detail below with reference to various exemplary embodiments, it should be understood that the invention is not limited to the specific configuration or methodologies of any of these embodiments. In addition, although the exemplary embodiments are described as embodying several different inventive features, those skilled in the art will appreciate that any one of these features could be implemented without the others in accordance with the invention.

I. Color Matching System

Figure 2:
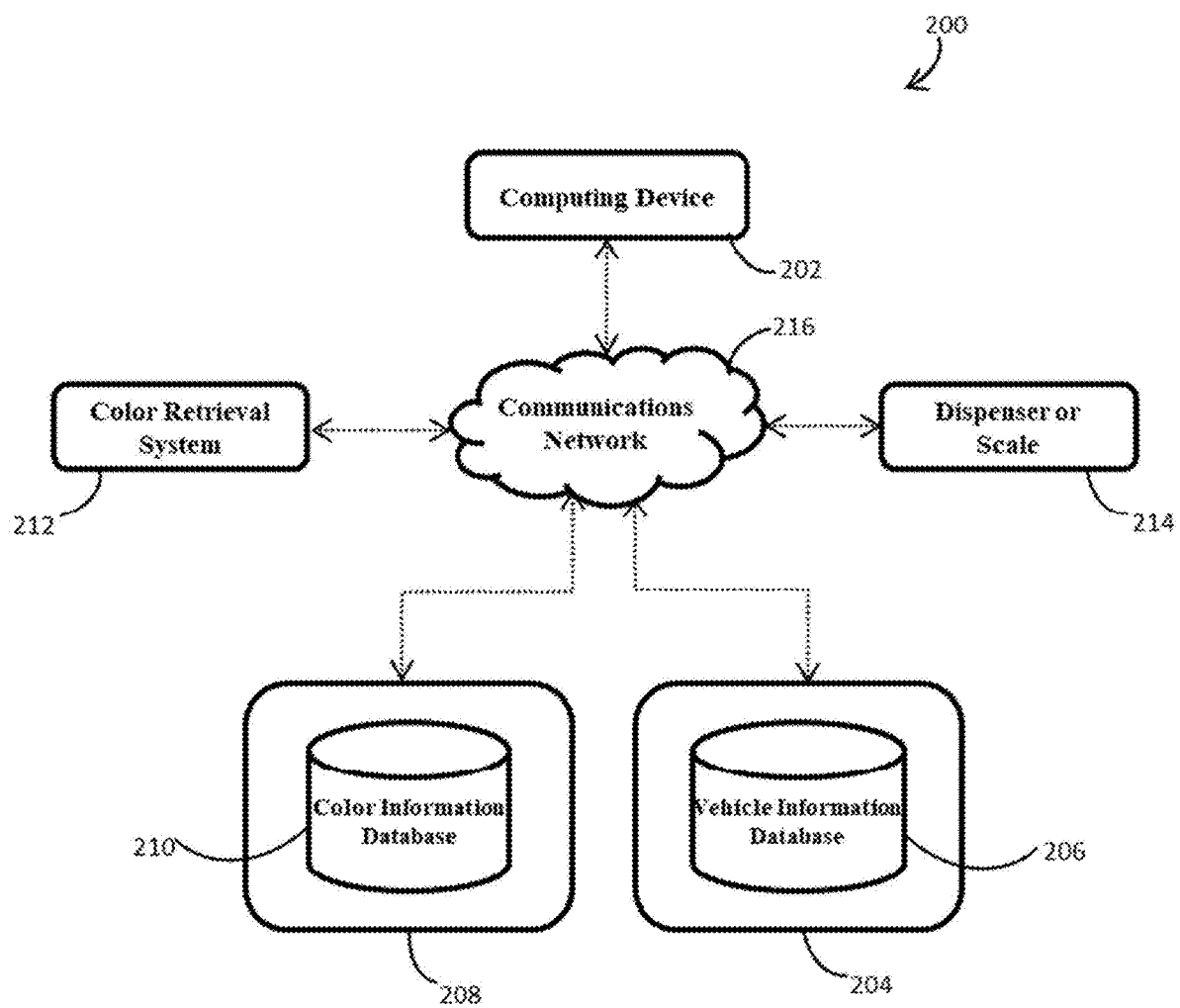
FIG. 2 is a block diagram of an automotive color matching system in accordance with an exemplary embodiment of the present invention.

Referring to FIG. 2, an automotive color matching system in accordance with an exemplary embodiment of the present invention is shown as reference numeral 200. In general, system 200 includes a plurality of network elements each of which has a network connection to a communications network 216. In this embodiment, the network elements include a computing device 202, a server system 204 that enables access to a vehicle information database 206, a server system 208 that enables access to a color information database 210, a color retrieval system 212 (which may be a conventional color retrieval system, as discussed above), and a paint dispenser or scale 214. Of course, in other embodiments, the system may not include all of the network elements shown in FIG. 2, or may include additional network elements.

In an exemplary embodiment, computing device 202 comprises a smartphone (such as those running on the iOS® and Android® operating systems, and others as well known to those skilled in the art) that executes a color matching application in accordance with the present invention. Computing device 202 may also comprise a personal computer, a laptop computer, a personal digital assistant, a personal computing tablet (such as those made by Apple® and Samsung®, and others as well known to those skilled in the art), a smart watch or other wearable device, smart glasses (e.g., Google, Ubimax, or a VR head set), and any other electronic computing device that is capable of communication (wireless or wired) with the other network elements via communications network 216. In general, computing device 202 is utilized by each user of system 200 (e.g., users at different auto body shops, etc.) and, accordingly, system 200 may include hundreds or even thousands of computing devices 202.

Referring still to FIG. 2, vehicle information database 206 is maintained by a server system 204 that may employ any number of servers, including web servers, file servers, application servers, and database servers, which are either co-located or geographically dispersed. In an exemplary embodiment, vehicle information database 206 contains a plurality of vehicle images each of which is associated with vehicle information, such as the make, model and/or model year of the vehicle.

Server system 204 is operable to receive a digital image of a vehicle from computing device 202, retrieve the vehicle information associated with the vehicle image from vehicle information database 206, and transmit the retrieved vehicle information back to computing device 202. Server system 204 may exchange data with computing device 202 via any communication means known to those skilled in the art, including a Web service or an Application Programming Interface (API). For example, in some embodiments, vehicle information database 206 is accessible through an API deployed on server system 204, such as the Automotive Recognition API available from Blippar.com Ltd. of London, Great Britain and the Vehicle Recognition API available from Sighthound, Inc. of Winter Park, Fla. Of course, other vehicle information databases may also be used in accordance with the present invention. Further, the vehicle information database may be created with the vehicle images and associated vehicle information obtained through use of the present invention, e.g., each computing device 202 may transmit the vehicle image(s) and associated vehicle information to a central server for collection of the information in a database.

Color information database 210 is also maintained by a server system 208 that may employ any number of servers, including web servers, file servers, application servers, and database servers, which are either co-located or geographically dispersed. In an exemplary embodiment, color information database 210 contains vehicle information (e.g., the make, model and/or model year of a vehicle) for a plurality of different vehicle types, wherein the vehicle information for each vehicle type is associated with color information. The color information associated with each vehicle type includes information for one or more colors or variants of colors associated with the vehicle type, i.e., the color options for that particular vehicle type.

In the exemplary embodiment, color information database 210 stores the following information for each color option: the color (e.g., red, black, etc.) and color values defined by any colorimetric system known to those skilled in the art (e.g., the CIE Standard Colorimetric System, the RGB Color Specification System, the HunterLab color system, etc.); an indication of whether the color is solid or has any color effect (e.g., metallic, pearlescent, Xirallic®, etc.) and the texture parameters for any color effect (e.g., graininess, coarseness, sparkle, etc.); and the color formula and any alternate color formulas available for the color and color effect. As used herein, the term "color formula" means the information needed to determine the constituents and mixing ratios required to ensure that a particular paint has a desired color and color effect, i.e., it is not the paint formulation itself. Of course, in other embodiments, other types of color information or any other combination of the foregoing information may be used in accordance with the present invention.

Server system 208 is operable to receive vehicle information from computing device 202, retrieve the color information associated with the vehicle information from color information database 210, and transmit the retrieved color information back to computing device 202. Server system 208 may exchange data with computing device 202 via any communication means known to those skilled in the art, including a Web service or an Application Programming Interface (API). An exemplary color information database 210 is the database utilized in the FormulaExpress® 2.0 Color Retrieval System available from The Sherwin-Williams Company. Of course, other color information databases may also be used in accordance with the present invention. For example, many automotive paint manufacturers who supply paint to the automotive refinish market have developed and provide databases that associate color information with vehicle information as described herein.

Server systems 204 and 208 are shown in FIG. 2 as two different systems, i.e., server system 204 maintains vehicle information database 206 and server system 208 maintains color information database 210. In other embodiments, vehicle information database 206 and color information database 210 may be maintained within the same server system. In yet other embodiments, vehicle information database 206 and/or color information database 210 may reside on computing device 202 itself, in which case server system 204 and/or server system 208 would not be required.

Color retrieval system 212 comprises a conventional color retrieval system that enables the manual entry of vehicle and color information, as discussed above. An example of color retrieval system 212 is the FormulaExpress® 2.0 Color Retrieval System available from The Sherwin-Williams Company. Of course, the color retrieval systems of other automotive paint suppliers may also be used. As described in greater detail below, computing device 202 may optionally receive certain types of information from color retrieval system 212 in some embodiments of the present invention.

Paint dispenser or scale 214 comprises any automotive paint dispenser or scale known to those skilled in the art. Examples of paint dispenser or scale 214 are the BBA212, BBA242, BBA242 Form, BBA242 WLAN, and BBA242 Paint scales available from Mettler Toledo of Columbus, Ohio, and the PMA5000, PMA.Evolution, and PMA.Vision scales available from Sartorius of Göttingen, Germany.

Communications network 216 may comprise any network capable of facilitating the exchange of data among the network elements of system 200, such as those that operate according to the IEEE 802.3 protocol (e.g., Ethernet), the IEEE 802.15 protocol (e.g., Bluetooth), and/or the IEEE 802.11 protocol (e.g., Wi-Fi). For example, in some embodiments, communications network 216 comprises a personal area network (PAN) or wireless PAN (WPAN), a local area network (LAN) or wireless LAN (WLAN), and/or a wide area network (WAN) or wireless WAN (WWAN), which is connectable to other communications networks and/or portions of the Internet or an intranet. The communications infrastructure may comprise any medium that allows data to be physically transferred through serial or parallel communication channels (e.g., wireless communication channel, cellular communications, optical fiber, copper wire, etc.).

Figure 3:
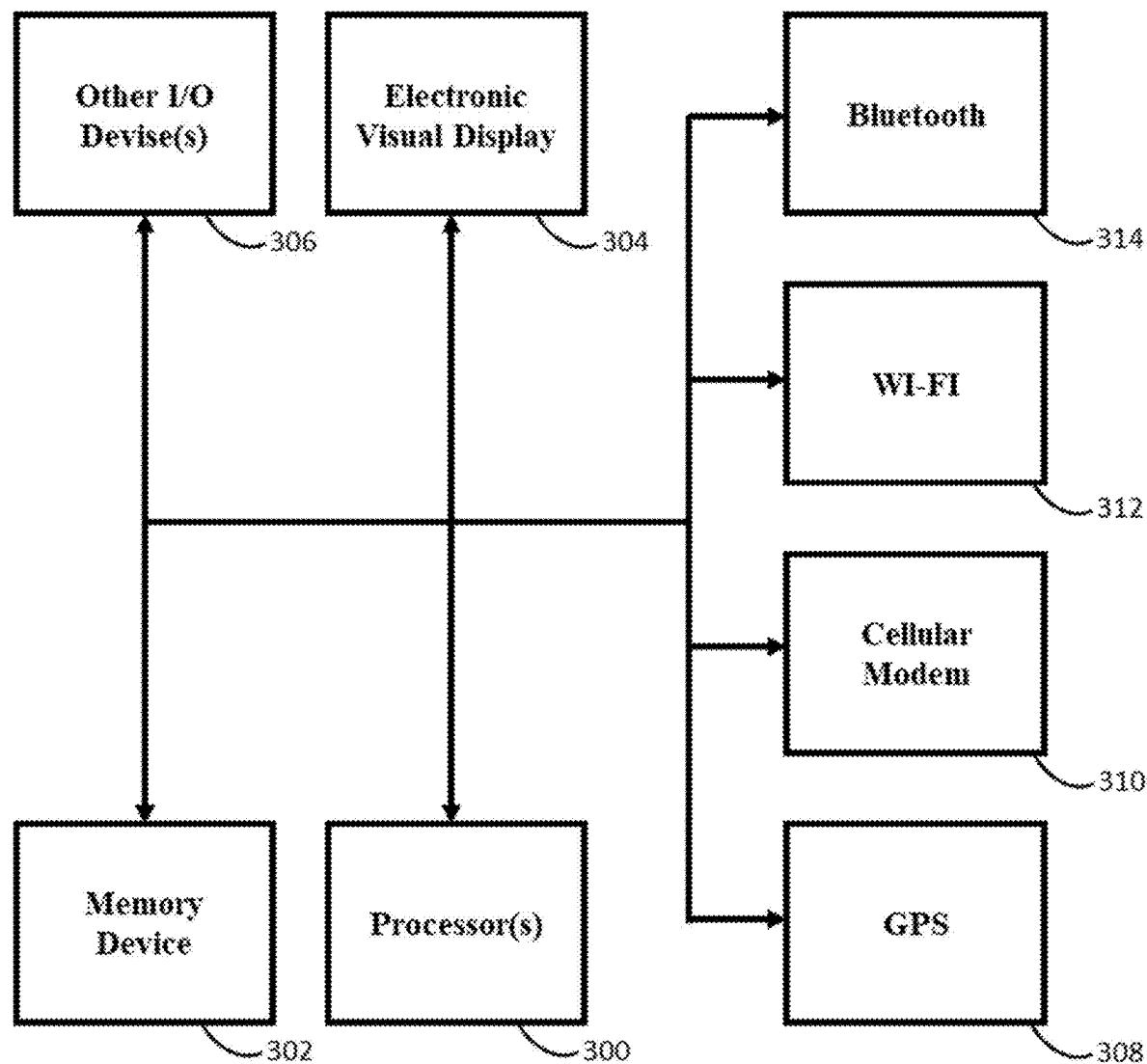
FIG. 3 is a block diagram of a smartphone that may be used as the computing device shown in FIG. 2.

FIG. 3 illustrates an exemplary embodiment of a smartphone that may be used as computing device 202 shown in FIG. 2. The smartphone includes one or more processors 300, a memory device 302, an electronic visual display 304, one or more other input/output (I/O) devices 306, and a wireless communications subsystem that includes one or more of a Global Positioning System (GPS) receiver 308, a cellular transceiver 310, a Wi-Fi transceiver 312, and a Bluetooth transceiver 314. The foregoing components are communicatively and/or electrically coupled to each other as shown in FIG. 3.

The one or more processors 300 are in data communication with memory device 302, which is configured to store processor-executable instructions comprising an operating system and an application that, when executed by a processor, cause the processor to perform a plurality of operations that enable selection of an automotive paint color that matches the vehicle's original paint finish. These methods will be described in greater detail below in connection with the process flow charts of FIGS. 4-36. Memory device 302 may also store data obtained through execution of the application, such as one or more vehicle images, color selections, etc., as described below. Of course, in other embodiments, processor 300 may store information on other memory devices (e.g., a remote file server) that are accessed through the communication subsystem described below Electronic visual display 304 is configured to present images, text, video, and the like to a viewer (e.g., a user of system 200). Exemplary electronic visual displays include, but are not limited to, screens, display devices, touchscreen display devices, and the like. Of course, in other embodiments, processor 300 may present information on other displays (e.g., the display of a different smartphone, the display of a personal computing tablet, or a television display) that are accessed through the communication subsystem described below. The other I/O devices 306 include, but are not limited to, one or more of a camera, a microphone, a speaker, a universal serial bus (USB) interface, an on/off switch, a subscriber identity module (SIM) interface, and the like.

The communication subsystem (i.e., GPS receiver 308, cellular transceiver 310, Wi-Fi transceiver 312, and/or Bluetooth transceiver 314) is configured to enable computing device 202 to communicate with other network elements, as described more fully herein. In the exemplary embodiment, the communication subsystem is configured to receive and transmit data in accordance with one or more communications protocols, such as those that operate according to the IEEE 802.15 protocol (e.g., Bluetooth), the IEEE 802.11 protocol (e.g., Wi-Fi), the Global System for Mobile Communications (GSM) standard, the Universal Mobile Telecommunications System (UMTS) standard, Code Division Multiple Access (CDMA) standards, and the like and/or combinations thereof.

II. Color Matching Methods

As discussed above, computing device 202 shown in FIG. 2 executes a color matching application that causes computing device 202 to communicate with other network elements via communication network 216 and obtain the information required to automatically or semi-automatically select an automotive paint color that matches the vehicle's original paint finish. Various examples of the color matching methods embodied in the color matching application executed by computing device 202 will now be described with reference to the components of the smartphone shown in FIG. 3. Of course, it should be understood that these methods could be performed by other types of computing devices, as described above.

Figure 4:
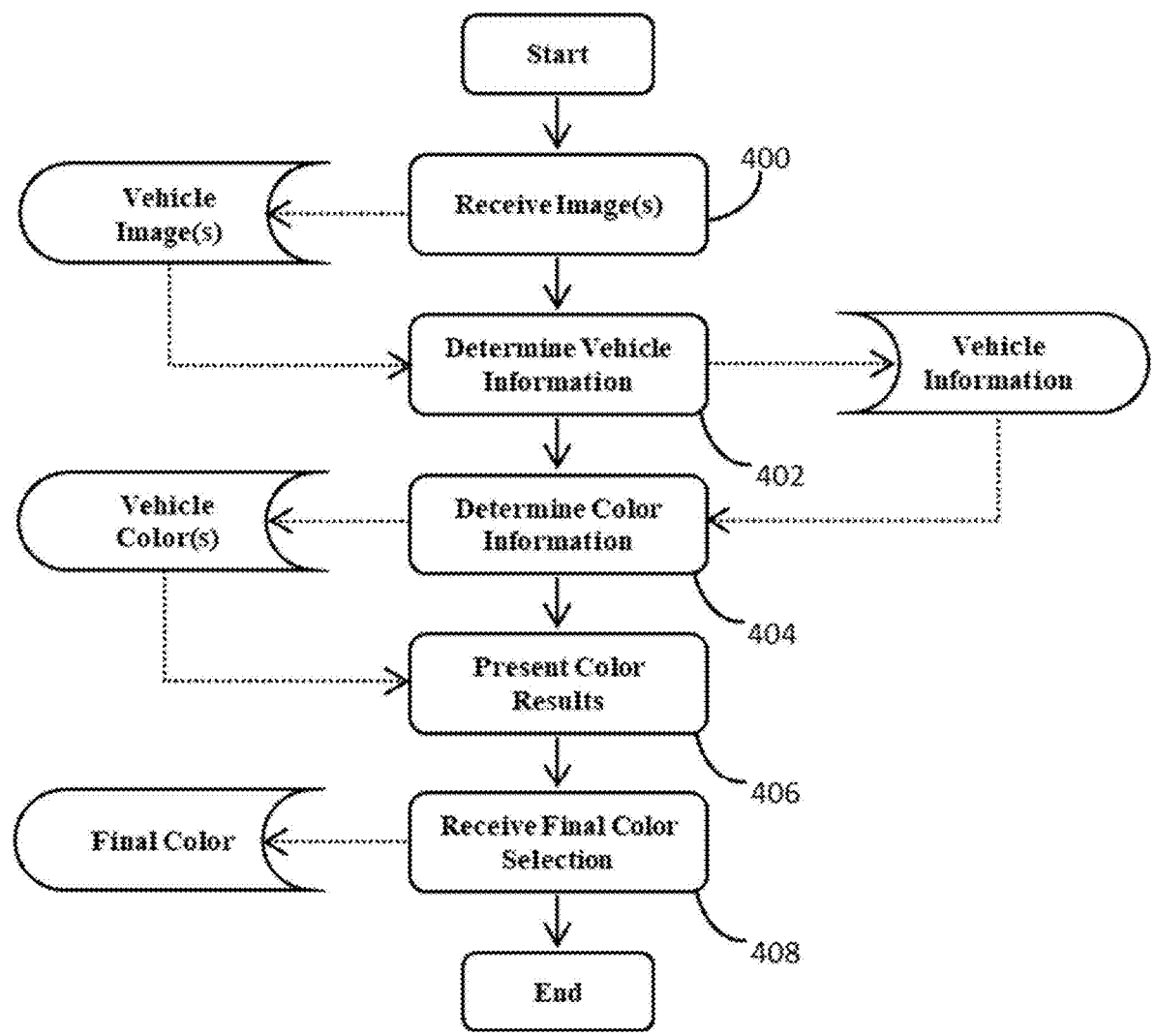
FIG. 4 is a process flow diagram of an automotive color matching method performed by the computing device shown in FIG. 2 in accordance with a first exemplary embodiment of the present invention.

Referring to FIG. 4, an automotive color matching method performed by computing device 202 in accordance with a first exemplary embodiment of the present invention is described with reference to steps 400-408.

In step 400, processor 300 receives one or more digital images of a vehicle that have been captured by a camera in communication with processor 300. Each vehicle image may be captured in real-time for use with the color matching method, or may be previously captured and stored in memory device 302 or other memory as described above. In some embodiments, the camera used to capture each vehicle image is incorporated within computing device 202 itself, e.g., in cases where computing device 202 comprises a smartphone or personal computing tablet with an integrated camera. For example, the smartphone shown in FIG. 3 includes a camera as one of I/O devices 306, which is used to capture each vehicle image. In other embodiments, the camera is provided as a separate component connected to computing device 202 through either a wired or wireless communication channel. For example, an external camera may be connected to a personal computer or laptop computer. As another example, the camera may comprise a web cam located within a body shop that captures a vehicle image and transmits the vehicle image to computing device 202 through one or more intermediate devices. For example, a camera or video camera may be mounted in a suitable location, such as the entrance of the body shop, and used to automatically take images of a vehicle without human interaction. In yet another example, the camera used to capture the vehicle image may be incorporated in other hardware, e.g., a camera of a spectrophotometer that is typically used for positioning purposes. Of course, any other type of camera known to those skilled in the art may be used in accordance with the present invention.

In step 402, processor 300 uses the vehicle image to determine information relating to the vehicle, e.g., the make, model, and/or model year of the vehicle. In some embodiments, processor 300 transmits the vehicle image to server system 204, in which case server system 204 accesses vehicle information database 206 to retrieve the vehicle information associated with the vehicle image and transmits the vehicle information back to processor 300.

In step 404, processor 300 uses the vehicle information to determine information relating to the available colors for that vehicle type. In some embodiments, processor 300 transmits the vehicle information to server system 208, in which case server system 208 accesses color information database 210 to retrieve the color information associated with the vehicle information and transmits the color information back to processor 300.

In step 406, processor 300 presents color results on an electronic visual display, e.g., electronic visual display 304 of the smartphone shown in FIG. 3 or any other display as described above. In some embodiments, the color results presented to the user comprise all of the color information obtained from color information database 210, including the color and color effect and all of the different aftermarket paint color formulas created for that vehicle type. In other embodiments, the color results presented to the user comprise only a portion of the color information obtained from color information database 210, such as the color and color effect (but not the color formulas) or the color formulas (but not the color and color effect). Finally, in step 408, processor 300 receives a final color selection from the color results presented to the user. The color formula for the selected final color may be transmitted to a paint dispenser or scale for application of paint to the vehicle.

Figure 5:
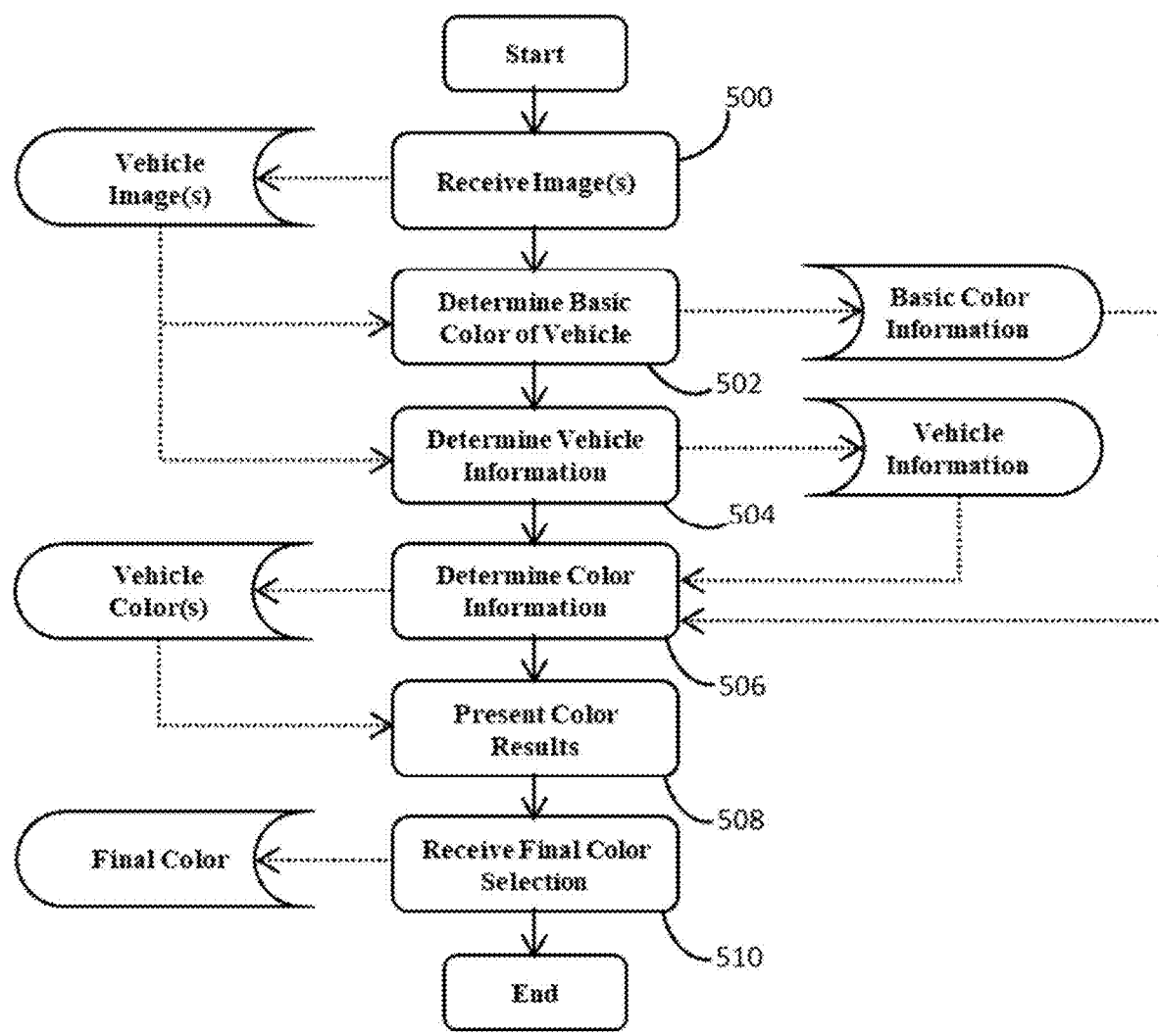
FIG. 5 is a process flow diagram of an automotive color matching method performed by the computing device shown in FIG. 2 in accordance with a second exemplary embodiment of the present invention.

Referring to FIG. 5, an automotive color matching method performed by computing device 202 in accordance with a second exemplary embodiment of the present invention is described with reference to steps 500-510.

In step 500, processor 300 receives one or more images of a vehicle that have been captured by a camera in communication with processor 300, as described above in connection with the first exemplary embodiment. In step 502, processor 300 uses the vehicle image to determine the basic color of the vehicle. In some embodiments, processor 300 uses a digital image analysis technique to identify the vehicle in the image and determine the basic color (e.g., red, blue, black, etc.) of the vehicle, as described in U.S. Pat. No. 6,768,814. In other embodiments, processor 300 transmits the vehicle image to another network device to determine the basic color of the vehicle using a suitable digital image analysis technique.

In step 504, processor 300 uses the vehicle image to determine information relating to the vehicle, e.g., the make, model, and/or model year of the vehicle, as discussed above in connection with the first exemplary embodiment. In step 506, processor 300 uses the vehicle information and the basic color information to determine the color information. In order to perform this step, processor 300 uses the vehicle information to determine the available colors for that vehicle type, i.e., the color information retrieved from color information database 210, as discussed above in connection with the first exemplary embodiment. Then, processor 300 uses the basic color information to filter the color information retrieved from color information database 210. For example, if the basic color is determined to be blue, processor 300 will identify the colors in the color information retrieved from color information database 210 that are the most similar to blue and exclude the other colors. It can be appreciated that this method of determining the color information will generally provide a shorter list of possible colors than that of the first exemplary embodiment.

In step 508, processor 300 presents color results on an electronic visual display, e.g., electronic visual display 304 of the smartphone shown in FIG. 3 or any other display as describe above. In some embodiments, the color results presented to the user comprise all of the color information for the filtered list of colors determined in step 506, including the color and color effect and all of the different aftermarket paint color formulas created for the colors in the filtered list. In other embodiments, the color results presented to the user comprise only a portion of the color information for the filtered list of colors determined in step 506, such as the color and color effect (but not the color formulas) or the color formulas (but not the color and color effect). Finally, in step 510, processor 300 receives a final color selection from the color results presented to the user. The color formula for the selected final color may be transmitted to a paint dispenser or scale for application of paint to the vehicle.

Figure 6:
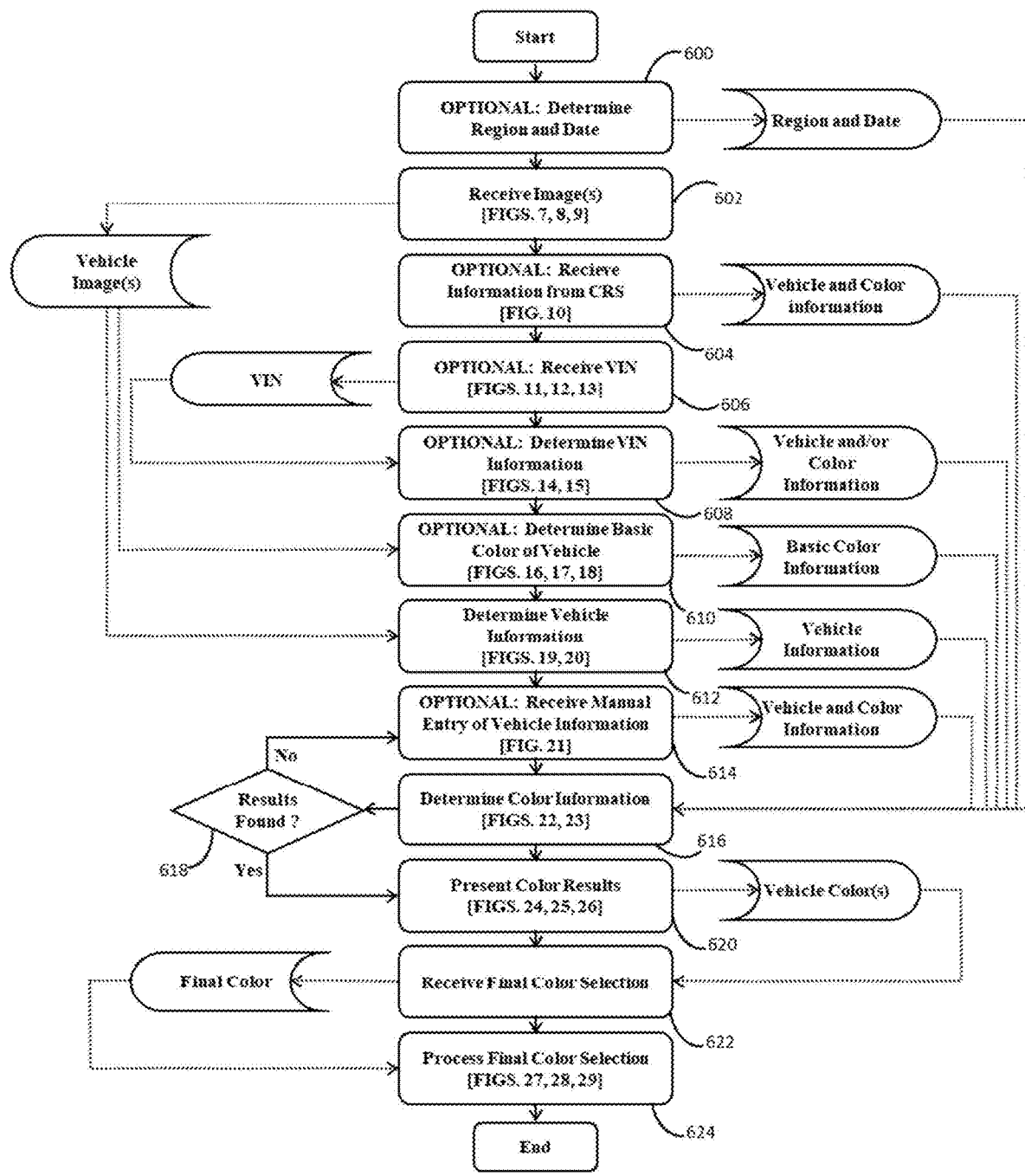
FIG. 6 is a process flow diagram of an automotive color matching method performed by the computing device shown in FIG. 2, which includes various required and optional steps that may be performed as part of the overall method.

Referring to FIG. 6, another exemplary embodiment of an automotive color matching method performed by computing device 202, which includes various required and optional steps that may be performed as part of the overall method, is described with reference to steps 600-624.

In step 600, processor 300 optionally determines the region associated with computing device 202. In some embodiments, processor 300 receives GPS information from a GPS receiver, and then uses the GPS information to ascertain the region. For example, the smartphone shown in FIG. 3 includes a GPS receiver 308 operable to receive GPS information, and processor 300 uses the received GPS information to ascertain the region. In other embodiments, processor 300 determines the region associated with computing device 202 based on the regional settings of the smartphone (time-zone, language, country, etc.). It will be seen that the region associated with computing device 202 may be used to determine the color information associated with a vehicle, as described in detail below.

Figure 7:
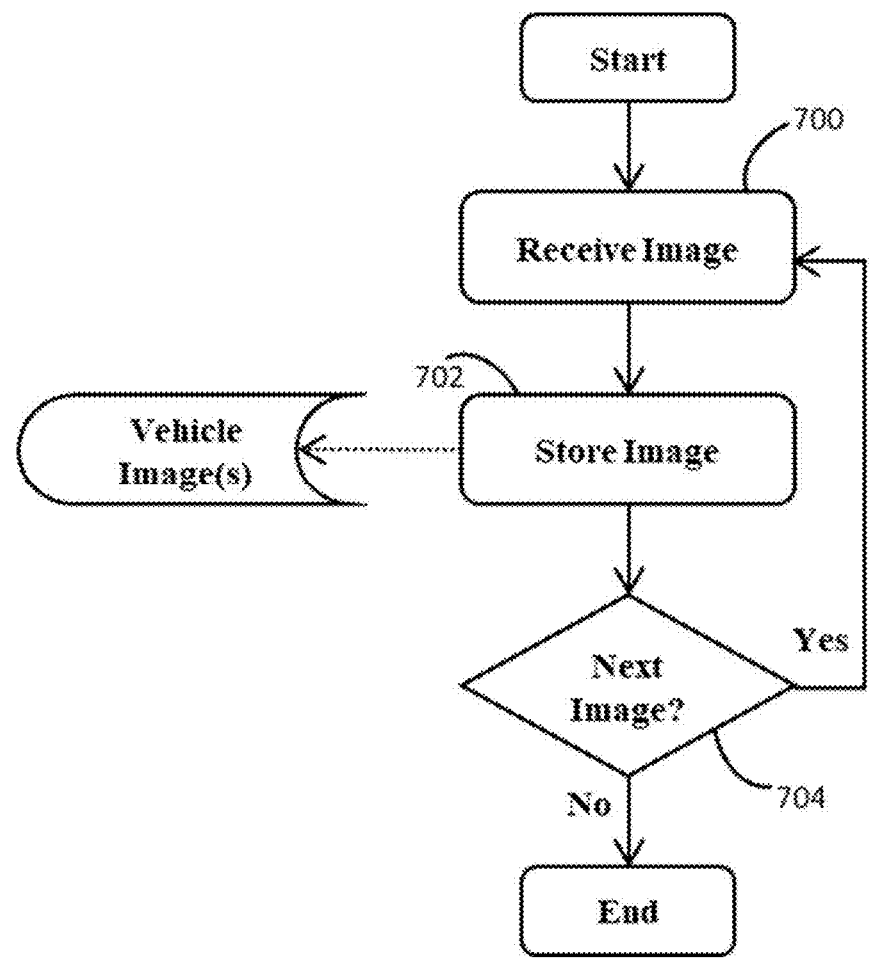
FIGS. 7, 8 and 9 are process flow diagrams of exemplary methods for receiving one or more digital images of a vehicle.
Figure 8:
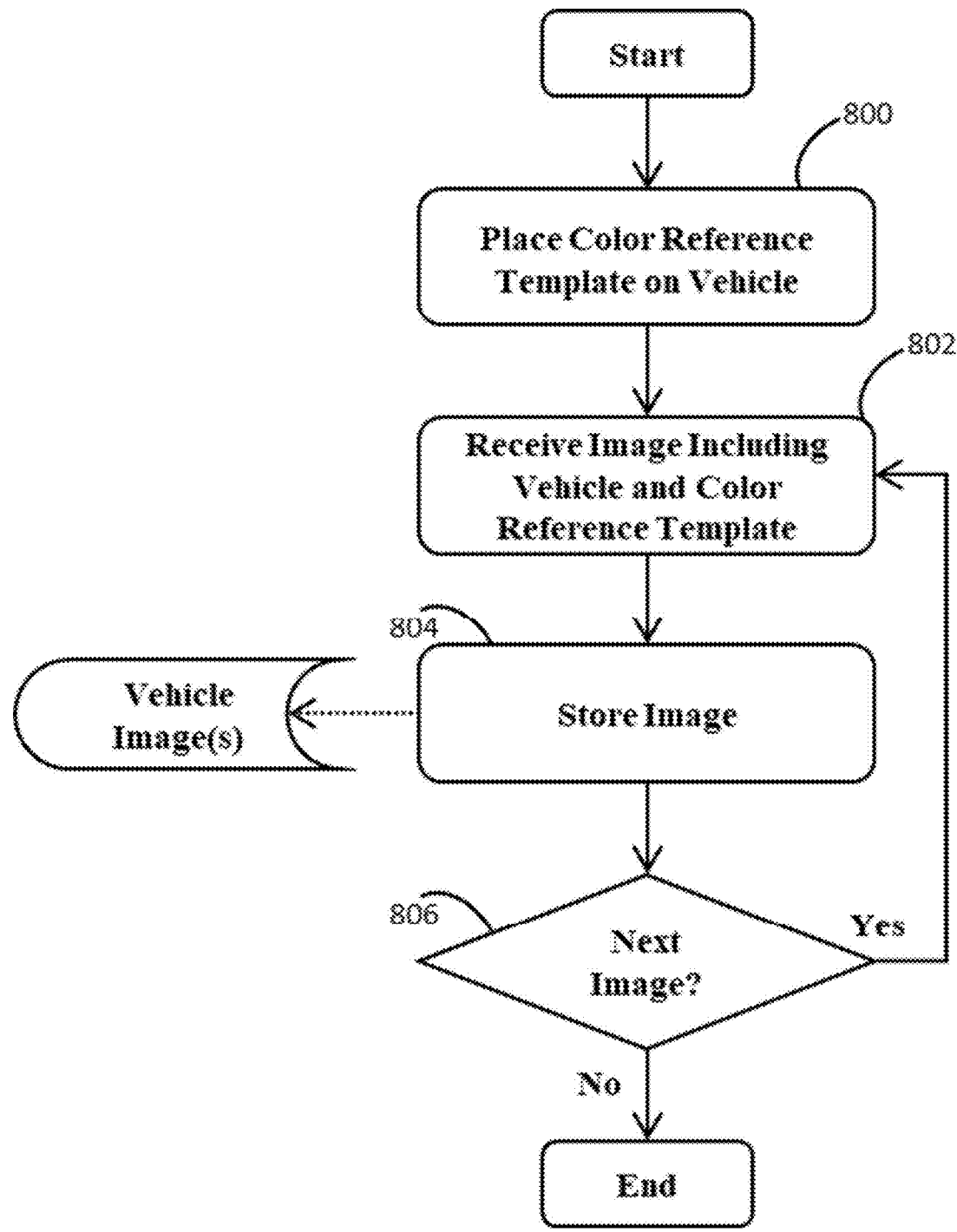
Figure 9:
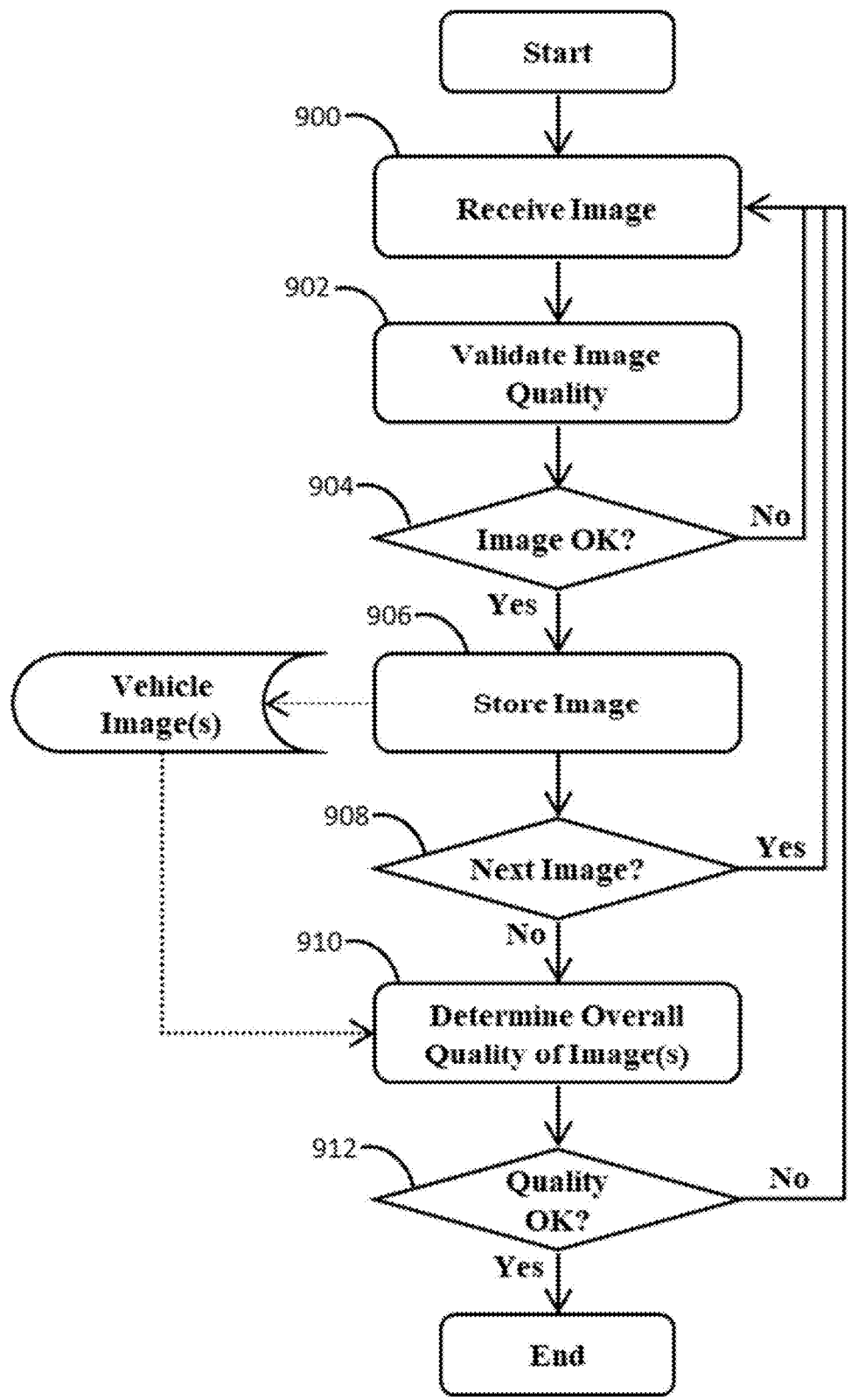

In step 602, processor 300 receives one or more digital images of a vehicle that have been captured by a camera in communication with processor 300. The camera used to capture each vehicle image is described above in connection with the first exemplary embodiment. FIGS. 7, 8 and 9 show three exemplary methods that may be performed by processor 300 to receive the vehicle image(s).

With reference to the exemplary method shown in FIG. 7, in step 700, processor 300 receives a digital image of a vehicle that has been captured by the camera. In step 702, processor 300 optionally stores the vehicle image in memory (e.g., memory device 302 shown in FIG. 3 or other memory as described above). In step 704, processor 300 determines if there is another vehicle image and, if so, the process returns to step 700. Otherwise, the process ends.

With reference to the exemplary method shown in FIG. 8, in step 800, a user places a color reference template on the vehicle (note that this step is manually performed by a user). The color reference template may comprise a white tile, a mosaic tile, a digital color card, or any other calibration tile or card known to those skilled in the art, such as those described in U.S. Pat. No. 6,768,814. Examples of color reference templates that may be used with the present invention include the calibration tiles and digital color cards available from X-Rite, Inc. of Grand Rapids, Mich., the digital color cards available from Akzo Nobel N.V. of Amsterdam, Netherlands, and the digital color cards available from Techkon USA of Danvers Mass.

In step 802, processor 300 receives a digital image that has been captured by the camera, wherein the image contains both the vehicle and the color reference template. It will be seen that the color reference template may be used to determine the basic color of the vehicle, as described in detail below. In step 804, processor 300 optionally stores the vehicle image in memory (e.g., memory device 302 shown in FIG. 3 or other memory as described above). In step 806, processor 300 determines if there is another vehicle image and, if so, the process returns to step 802. Otherwise, the process ends.

With reference to the exemplary method shown in FIG. 9, in step 900, processor 300 receives a digital image of a vehicle that has been captured by the camera. In step 902, processor 300 validates the quality of the image. For example, processor 300 may analyze the image to ensure that the entire vehicle or at least the relevant portion of the vehicle is contained in the image, to ensure that the image was taken at a suitable distance from the vehicle, and/or to ensure that the image is not blurry or too dark. In step 904, processor 300 determines if the quality of the vehicle image has been validated and, if not, the process returns to step 900 for receipt of another vehicle image. If the image quality is validated, processor 300 optionally stores the vehicle image in memory (e.g., memory device 302 shown in FIG. 3 or other memory as described above) in step 906. In step 908, processor 300 determines if there is another vehicle image and, if so, the process returns to step 900. Otherwise, in step 910, processor 300 determines whether the overall quality of the vehicle image(s) is acceptable (e.g., if the algorithms did not weed out one or more low quality images and/or if the vehicle information retrieved from vehicle information database 206 is inconclusive such that additional vehicle images are desired). In some embodiments, processor 300 presents the vehicle image(s) on electronic visual display 304 and requests user input on the overall quality of the image(s). In step 912, processor 300 determines whether the image quality is acceptable and, if not, the process returns to step 900. Otherwise, the process ends.

Figure 10:
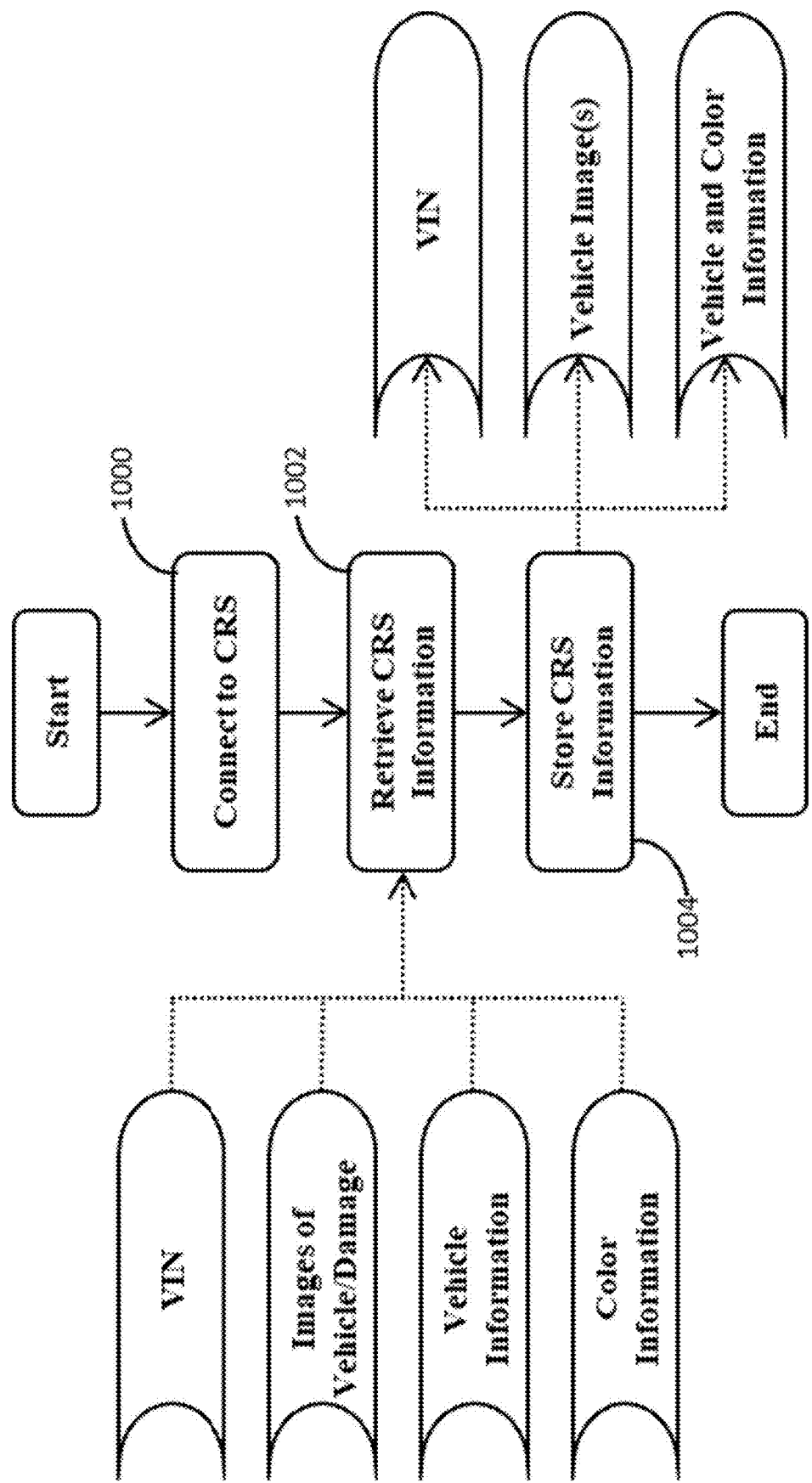
FIG. 10 is a process flow diagram of an exemplary method for receiving information from a color retrieval system.

Referring back to FIG. 6, in step 604, processor 300 optionally receives information from a color retrieval system (i.e., CRS information), such as color retrieval system 212 shown in FIG. 2, in order to use any information that is already available that may add value in color retrieval. FIG. 10 shows an exemplary method that may be performed by processor 300 to receive the CRS information. In step 1000, processor 1000 establishes a connection with color retrieval system 212. In step 1002, processor 300 retrieves CRS information from color retrieval system 212, wherein the CRS information may include all or any portion of the information that is manually entered by a user into color retrieval system 212. Examples of CRS information include, for example, the vehicle identification number (VIN) for the vehicle, one or more digital images of the vehicle that have been obtain for insurance purposes, vehicle information (e.g., the make, model, and or model year of the vehicle), and/or color information (e.g., the color and/or color effect of the vehicle). In step 1004, processor 300 optionally stores the CIS information in memory (e.g., memory device 302 shown in FIG. 3 or other memory as described above).

Figure 11:
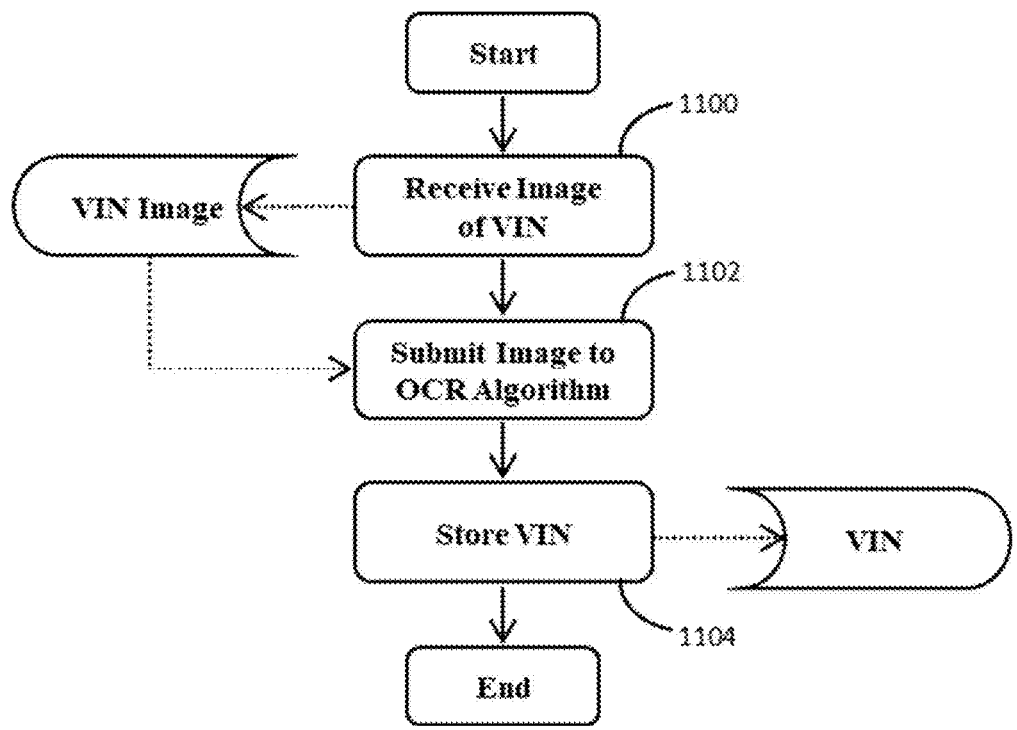
FIGS. 11, 12 and 13 are process flow diagrams of exemplary methods for receiving a vehicle identification number (VIN).
Figure 12:
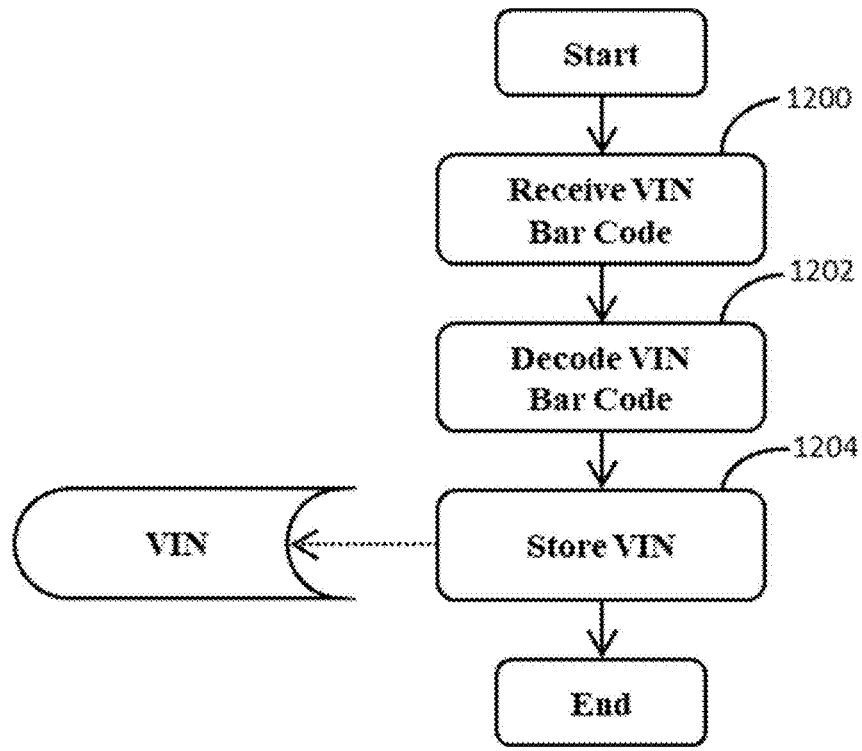
Figure 13:
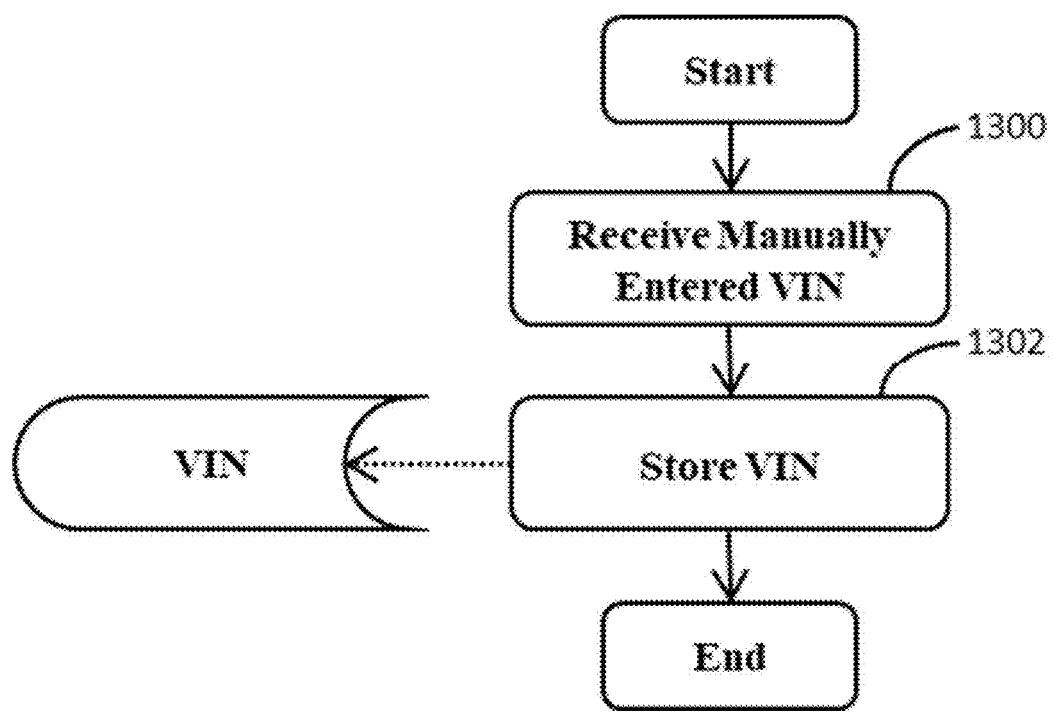

Referring back to FIG. 6, in step 606, processor 300 optionally receives the vehicle identification number (VIN) for the vehicle. FIGS. 11, 12 and 13 show three exemplary methods that may be performed by processor 300 to receive the VIN.

With reference to the exemplary method shown in FIG. 11, in step 1100, processor 300 receives a digital image of the VIN that has been captured by a camera in communication with processor 300. The camera used to capture the VIN image may be the same as the camera used to obtain each vehicle image, e.g., the camera of a smartphone or personal computing tablet. In step 1102, processor 300 applies an optical character recognition (OCR) algorithm to the VIN image in order to determine the VIN. In step 1104, processor 300 optionally stores the VIN in memory (e.g., memory device 302 shown in FIG. 3 or other memory as described above).

With reference to the exemplary method shown in FIG. 12, in step 1200, processor 300 receives a VIN barcode that has been captured by a camera in communication with processor 300. The camera used to capture the VIN barcode may be the same as the camera used to obtain each vehicle image, e.g., the camera of a smartphone or personal computing tablet. In step 1202, processor 300 decodes the VIN barcode in order to determine the VIN. In step 1204, processor 300 optionally stores the VIN in memory (e.g., memory device 302 shown in FIG. 3 or other memory as described above).

With reference to the exemplary method shown in FIG. 13, in step 1300, processor 300 receives a VIN that has been manually entered by a user. In some embodiments, processor 300 presents a request for entry of the VIN on electronic visual display 304 and receives the manually entered VIN. In step 1302, processor 300 optionally stores the VIN in memory (e.g., memory device 302 shown in FIG. 3 or other memory as described above).

Figure 14:
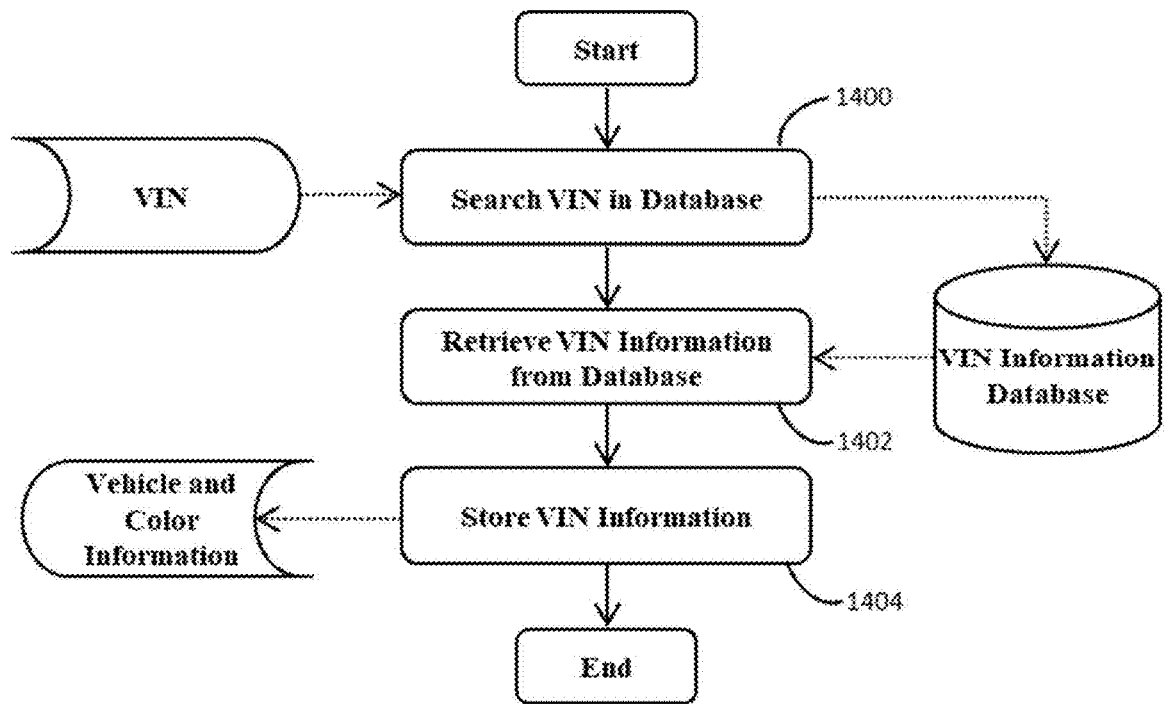
FIGS. 14 and 15 are process flow diagrams of exemplary methods for determining VIN information based on the VIN.
Figure 15:
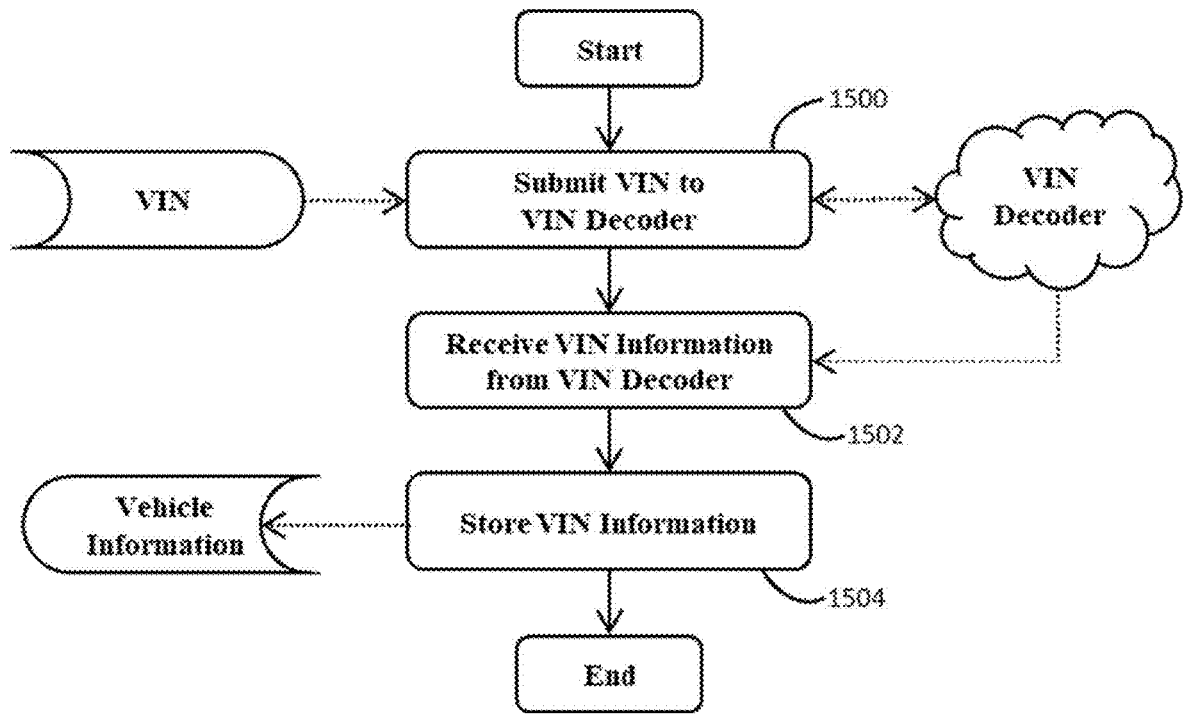

Referring back to FIG. 6, in step 608, processor 300 optionally determines information relating to the received VIN. FIGS. 14 and 15 show two exemplary methods that may be performed by processor 300 to determine the VIN information.

With reference to the exemplary method shown in FIG. 14, in step 1400, processor 300 accesses a VIN information database to retrieve the VIN information associated with the VIN. The VIN information database stores a plurality of VINs in association with VIN information, wherein the VIN information for each VIN comprises vehicle information (e.g., the make, model, and/or model year of the vehicle) and/or color information (e.g., the color and color effect and/or the aftermarket paint color formula for the vehicle). In step 1402, processor 300 retrieves the VIN information associated with the VIN from the VIN information database. In step 1404, processor 300 optionally stores the VIN information in memory (e.g., memory device 302 shown in FIG. 3 or other memory as described above).

In some embodiments, the VIN information database is maintained by a server system that is one of the network elements of system 200 (not shown in FIG. 2). The server system is operable to receive the VIN from computing device 202, retrieve the VIN information associated with the VIN from the VIN information database, and transmit the retrieved VIN information back to computing device 202. An exemplary VIN information database is described in European Patent Publication No. EP1139234. Of course, other VIN information databases may also be used in accordance with the present invention.

With reference to the exemplary method shown in FIG. 15, in step 1500, processor 300 submits the VIN to a VIN decoder. As known to those skilled in the art, a VIN decoder receives a 17-digit VIN and returns the vehicle manufacturer, brand, make and model, body style, engine size, assembly plant, and model year of the vehicle. The information is provided by the National Highway Traffic Safety Administration (NHTSA) from the data submitted by the manufacturers to NHTSA. In step 1502, processor 300 retrieves the VIN information associated with the VIN from the VIN decoder and, in step 1504, processor 300 optionally stores the VIN information in memory (e.g., memory device 302 shown in FIG. 3 or other memory as described above).

Figure 16:
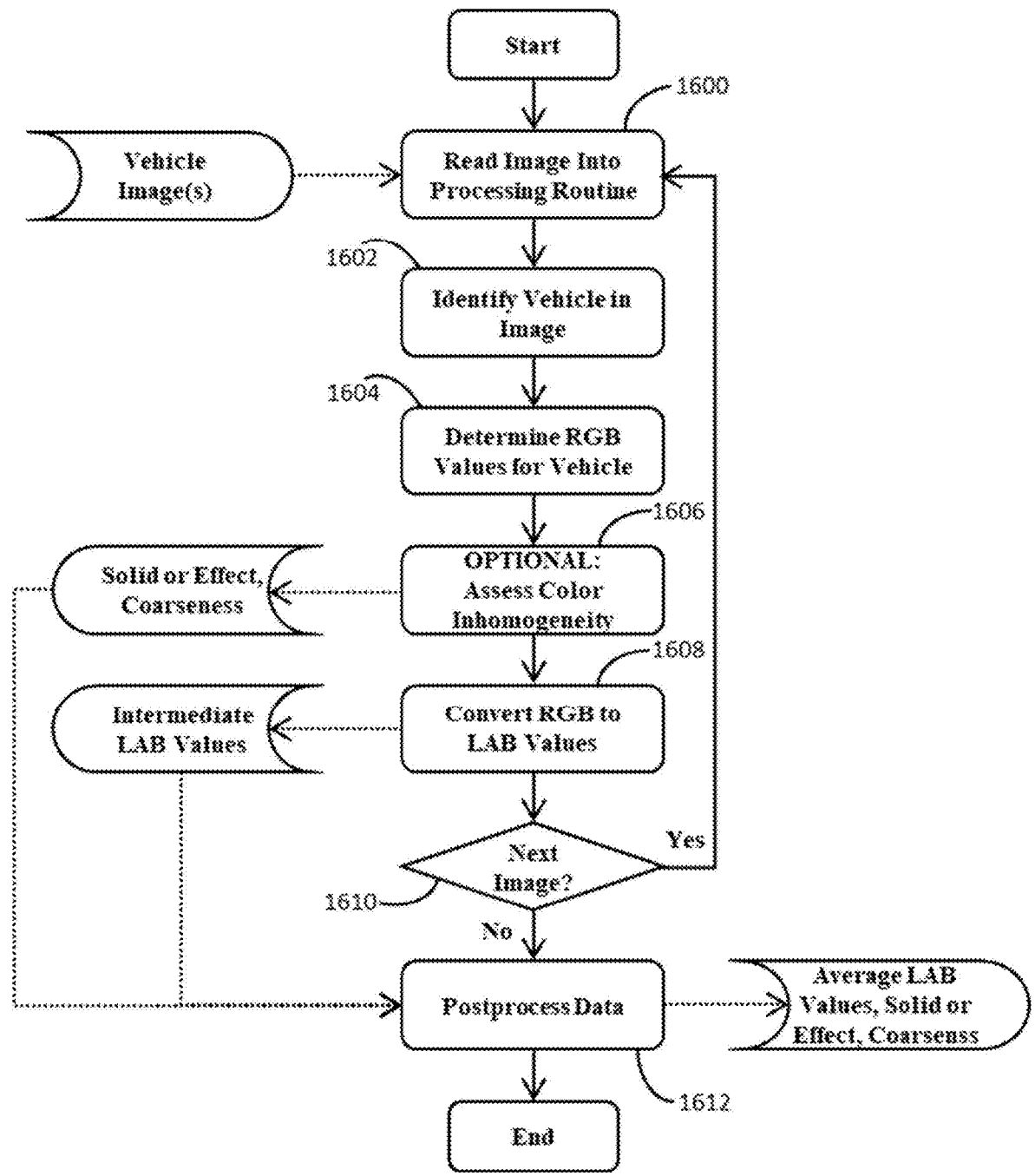
FIGS. 16, 17 and 18 are process flow diagrams of exemplary methods for using a digital image analysis technique to determine the basic color of a vehicle contained within one or more digital images.
Figure 17:
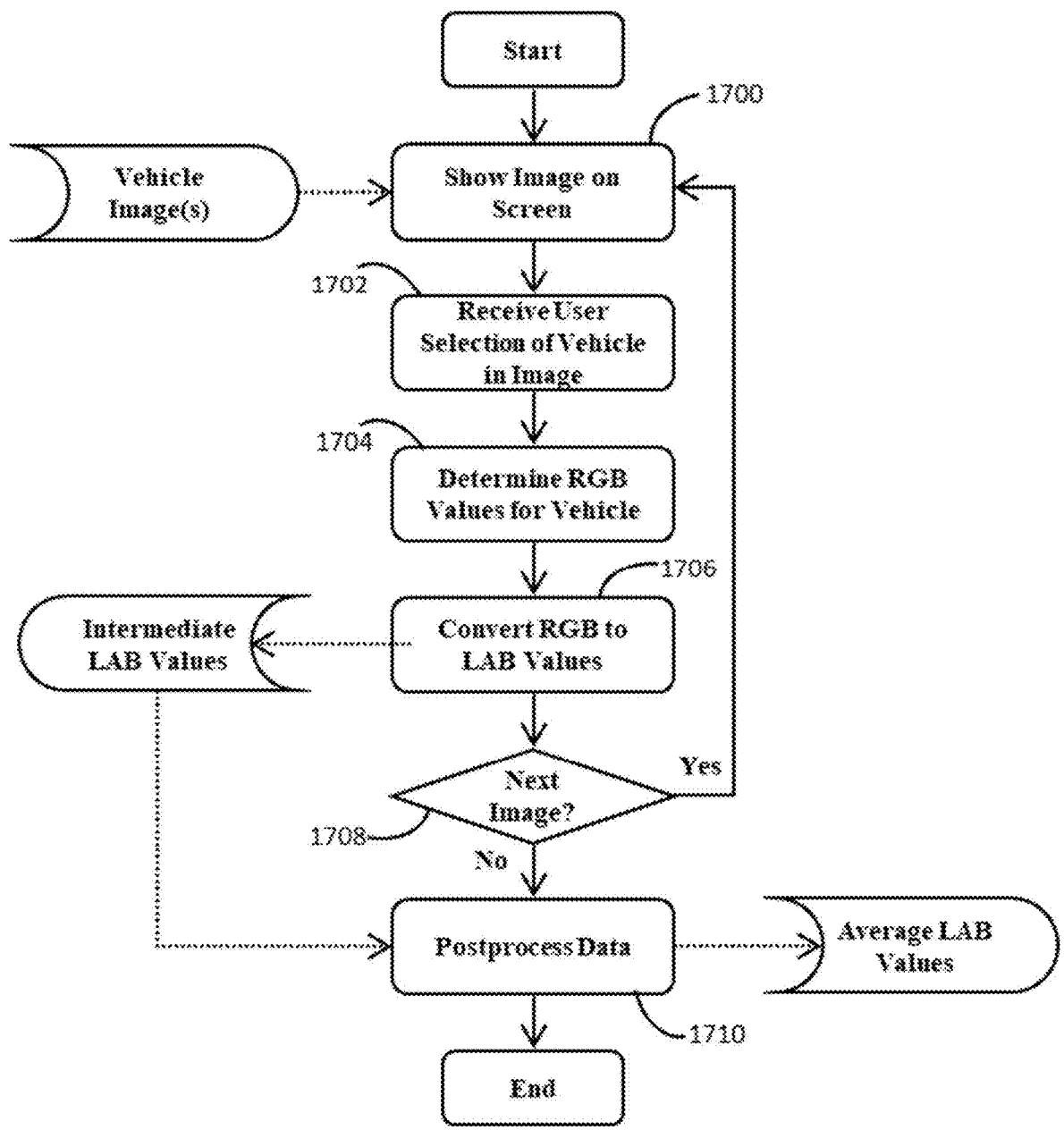
Figure 18:
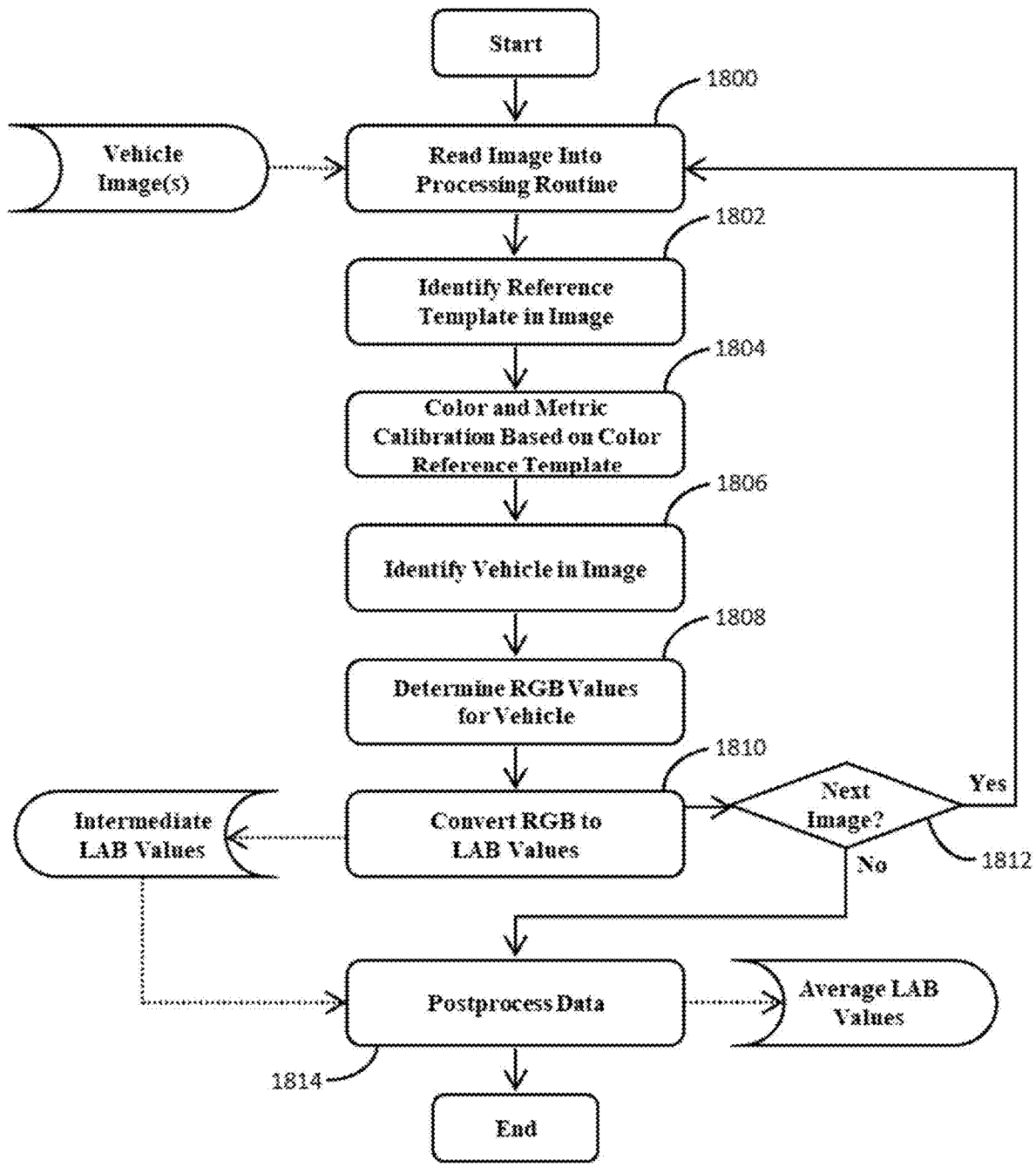

Referring back to FIG. 6, in step 610, processor 300 optionally uses the digital image(s) of the vehicle to determine the basic color of the vehicle. FIGS. 16, 17 and 18 show three exemplary methods that may be performed by processor 300 to determine the basic color of the vehicle.

With reference to the exemplary method shown in FIG. 16, in step 1600, processor 300 reads the vehicle image into a processing routine. In step 1602, processor 300 identifies the vehicle in the image and, in step 1604, processor 300 determines the RGB values for the vehicle portion of the image. The RGB values include a red, green, and blue intensity value on a scale of 0 to 255 (or in hexadecimal from 00 to FF), as known to those skilled in the art. The determination of RGB values from an image is described, for example, in U.S. Pat. No. 6,768,814. In step 1606, processor 300 optionally assesses the color inhomogeneity by analyzing the variation of the RGB values within the image to determine whether the color is a solid color or a color effect (e.g., metallic, pearlescent, Xirallic®, etc.). In some embodiments, processor 300 may also be able to determine the texture parameters of the vehicle finish (e.g., graininess, coarseness, sparkle, etc.). Of course, the ability to identify the texture parameters will depend on the quality of the camera used to obtain the vehicle image. Even in cases where the texture parameters cannot be exactly determined, this process may be used to filter the colors. For example, if coarseness has a range of 0 to 6 (0 being a solid), and if you determine a coarseness of 2 with an accuracy of ±1, then all color formulas with a coarseness less than 1 and more than 3 can be omitted from the search results.

In step 1608, processor 300 converts the RGB values determined in step 1604 to L*a*b* color values. The L*a*b* color values are based on the CIELAB color space defined by the International Commission on Illumination (CIE), which expresses color as three values: L* for the lightness from black (0) to white (100), a* from green (−) to red (+), and b* from blue (−) to yellow (+), as known to those skilled in the art. Of course, as discussed above, other colorimetric systems may also be used in accordance with the present invention.

In step 1610, processor 300 determines if there is another vehicle image and, if so, the process returns to step 1600. Otherwise, in step 1612, processor 300 processes the color effect and texture parameters obtained in step 1606 for each of the vehicle images (which are optional) and the L*a*b* color values calculated in step 1608 for each of the vehicle images in order to determine an average for each of these values. Any outlier values may be ignored when calculating the average values. Processor 300 then optionally stores this information in memory (e.g., memory device 302 shown in FIG. 3 or other memory as described above).

With reference to the exemplary method shown in FIG. 17, in step 1700, processor 300 presents a vehicle image on electronic visual display 304 and requests user input on the location of the vehicle in the image. In step 1702, processor 300 receives the user selection of the vehicle location in the image (or the relevant portion of the vehicle or simply a region in the image that is representative of the vehicle color) and, in step 1704, processor 300 determines the RGB values for the vehicle portion of the image, as discussed above. In step 1706, processor 300 converts the RGB values to L*a*b* color values, as discussed above. In step 1708, processor 300 determines if there is another vehicle image and, if so, the process returns to step 1700. Otherwise, in step 1710, processor 300 processes the L*a*b* color values calculated in step 1706 for each of the vehicle images in order to determine an average for these values. Any outlier values may be ignored when calculating the average values. Processor 300 then optionally stores this information in memory (e.g., memory device 302 shown in FIG. 3 or other memory as described above).

With reference to the exemplary method shown in FIG. 18, in step 1800, processor 300 reads the vehicle image into a processing routine. In step 1802, processor 300 identifies a color reference template in the image (e.g., the color reference template discussed above in connection with FIG. 8) and, in step 1804, processor 300 uses the color reference template to calibrate the system and thereby obtain a more accurate color of the vehicle in the image. An example of a suitable calibration technique is described in U.S. Pat. No. 6,768,814.

In step 1806, processor 300 identifies the vehicle in the image and, in step 1808, processor 300 determines the RGB values for the vehicle portion of the image, as discussed above. In step 1810, processor 300 converts the RGB values to L*a*b* color values, as discussed above. In step 1812, processor 300 determines if there is another vehicle image and, if so, the process returns to step 1800. Otherwise, in step 1814, processor 300 processes the L*a*b* color values calculated in step 1810 for each of the vehicle images in order to determine an average for these values. Any outlier values may be ignored when calculating the average values. Processor 300 then optionally stores this information in memory (e.g., memory device 302 shown in FIG. 3 or other memory as described above).

Figure 19:
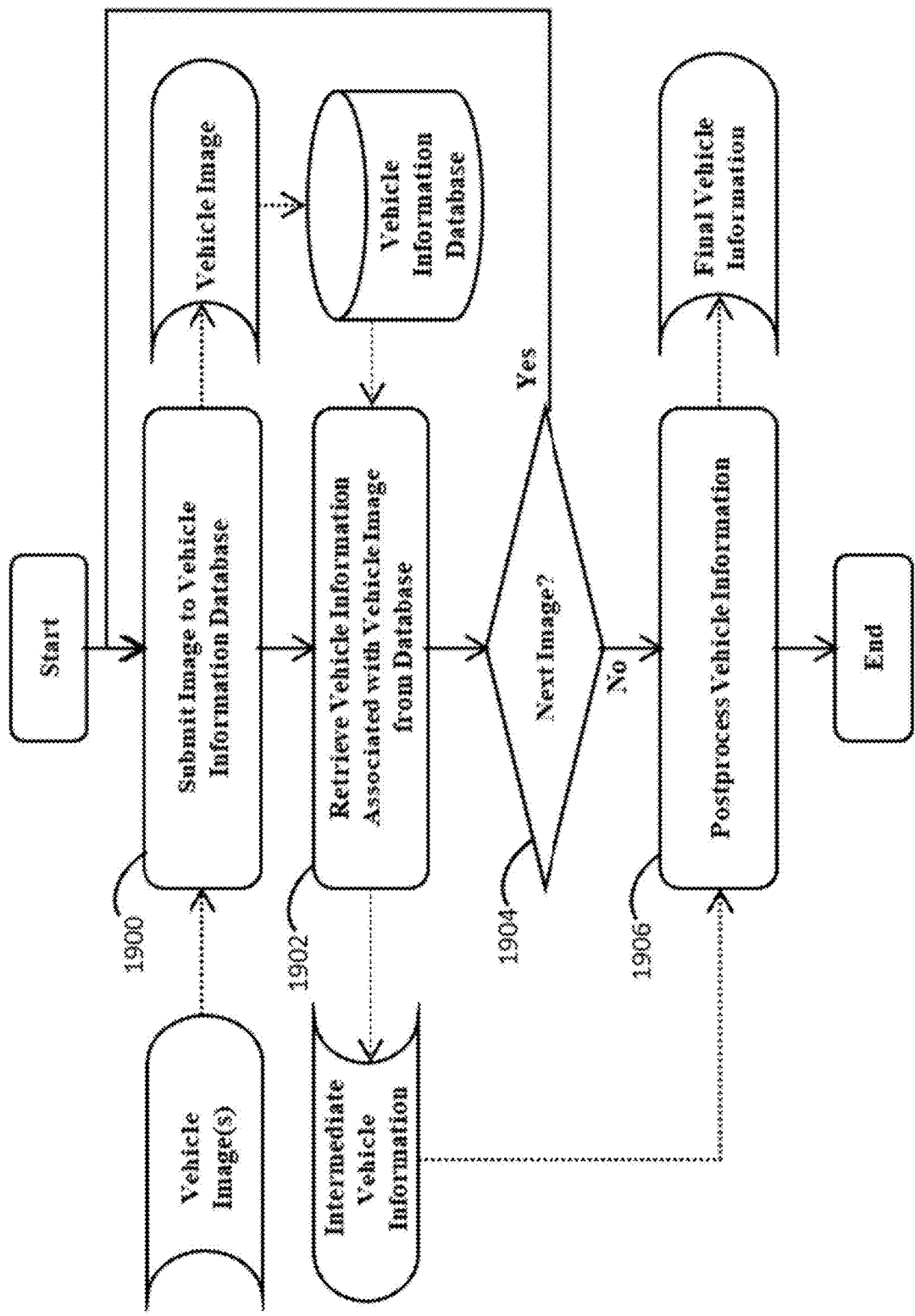
FIGS. 19 and 20 are process flow diagrams of exemplary methods for determining vehicle information for a vehicle.
Figure 20:
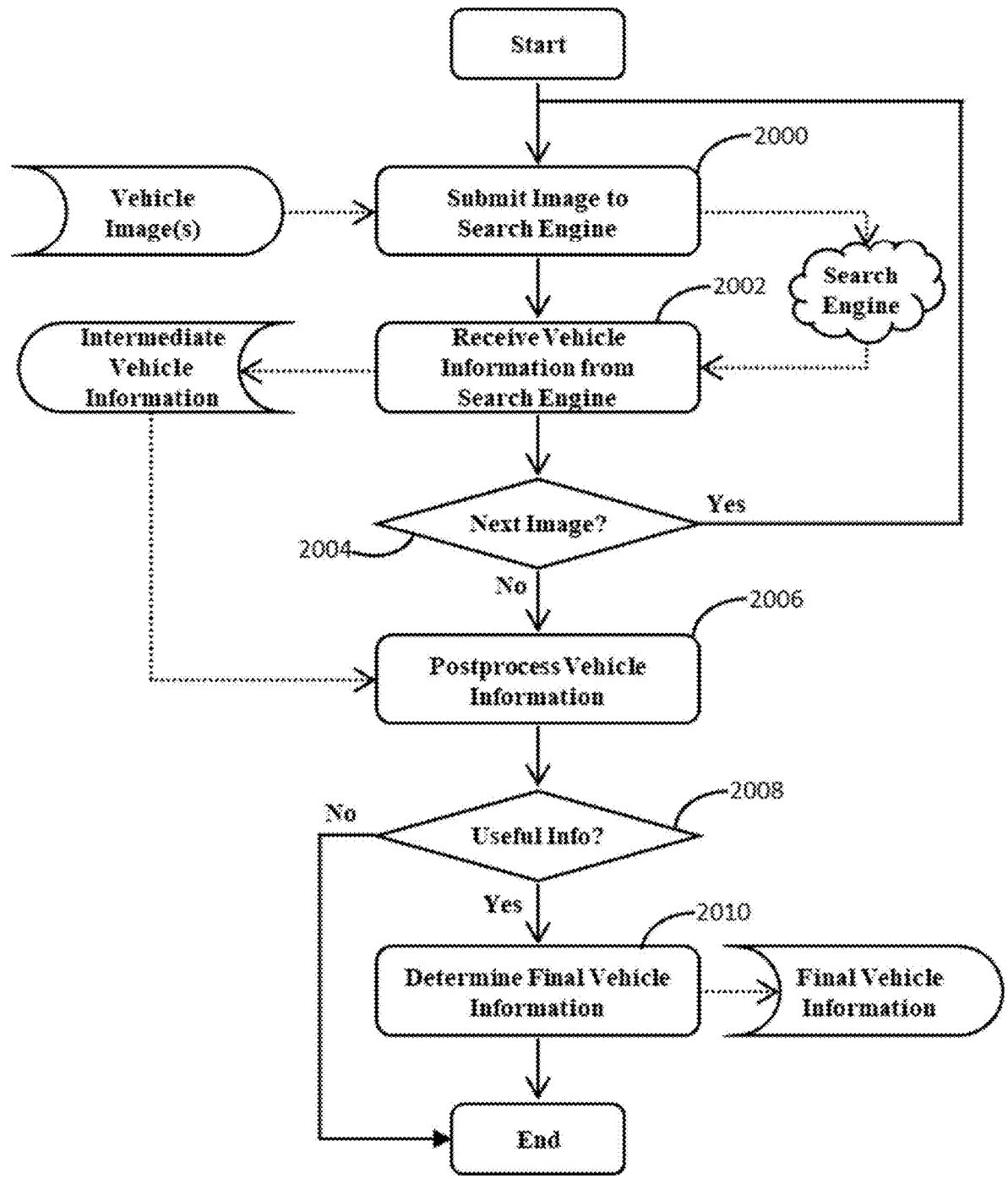

Referring back to FIG. 6, in step 612, processor 300 uses the image of the vehicle to determine information relating to the vehicle, e.g., the make, model, and/or model year of the vehicle. FIGS. 19 and 20 show two exemplary methods that may be performed by processor 300 to determine the vehicle information.

With reference to the exemplary method shown in FIG. 19, in step 1900, processor 300 transmits the vehicle image to server system 204, in which case server system 204 accesses vehicle information database 206 to retrieve the vehicle information (i.e., the make, model, and/or model year of the vehicle) associated with the vehicle image and transmits the vehicle information back to processor 300. In step 1902, processor 300 receives the vehicle information from server system 204. In step 1904, processor 300 determines if there is another vehicle image and, if so, the process returns to step 1900. Otherwise, in step 1906, processor 300 processes the vehicle information received in step 1902 for each of the vehicle images using statistical or data science methods to evaluate the correctness and completeness of the information in order to determine the final vehicle information. Processor 300 then optionally stores this information in memory (e.g., memory device 302 shown in FIG. 3 or other memory as described above).

With reference to the exemplary method shown in FIG. 20, in step 2000, processor 300 submits the vehicle image to a search engine (e.g., an Internet search engine) and, in step 2002, processor 300 receives the vehicle information (i.e., the make, model, and/or model year of the vehicle) located by the search engine. In step 2004, processor 300 determines if there is another vehicle image and, if so, the process returns to step 2000. Otherwise, in step 2006, processor 300 processes the vehicle information received in step 2002 for each of the vehicle images in order to determine if the vehicle information is useful. In some embodiments, processor 300 presents the vehicle information on electronic visual display 304 and requests user input on the usefulness of the information, i.e., whether the search results are a good result. For example, if the vehicle information indicates that the vehicle is a Volkswagen Passat when the vehicle is some type of BMW, the user may indicate that the vehicle information is not useful. In step 2008, processor 300 determines whether the vehicle information is useful and, if so, the vehicle information is deemed to be the final vehicle information and optionally stored in memory (e.g., memory device 302 shown in FIG. 3 or other memory as described above). Otherwise, the process ends.

Figure 21:
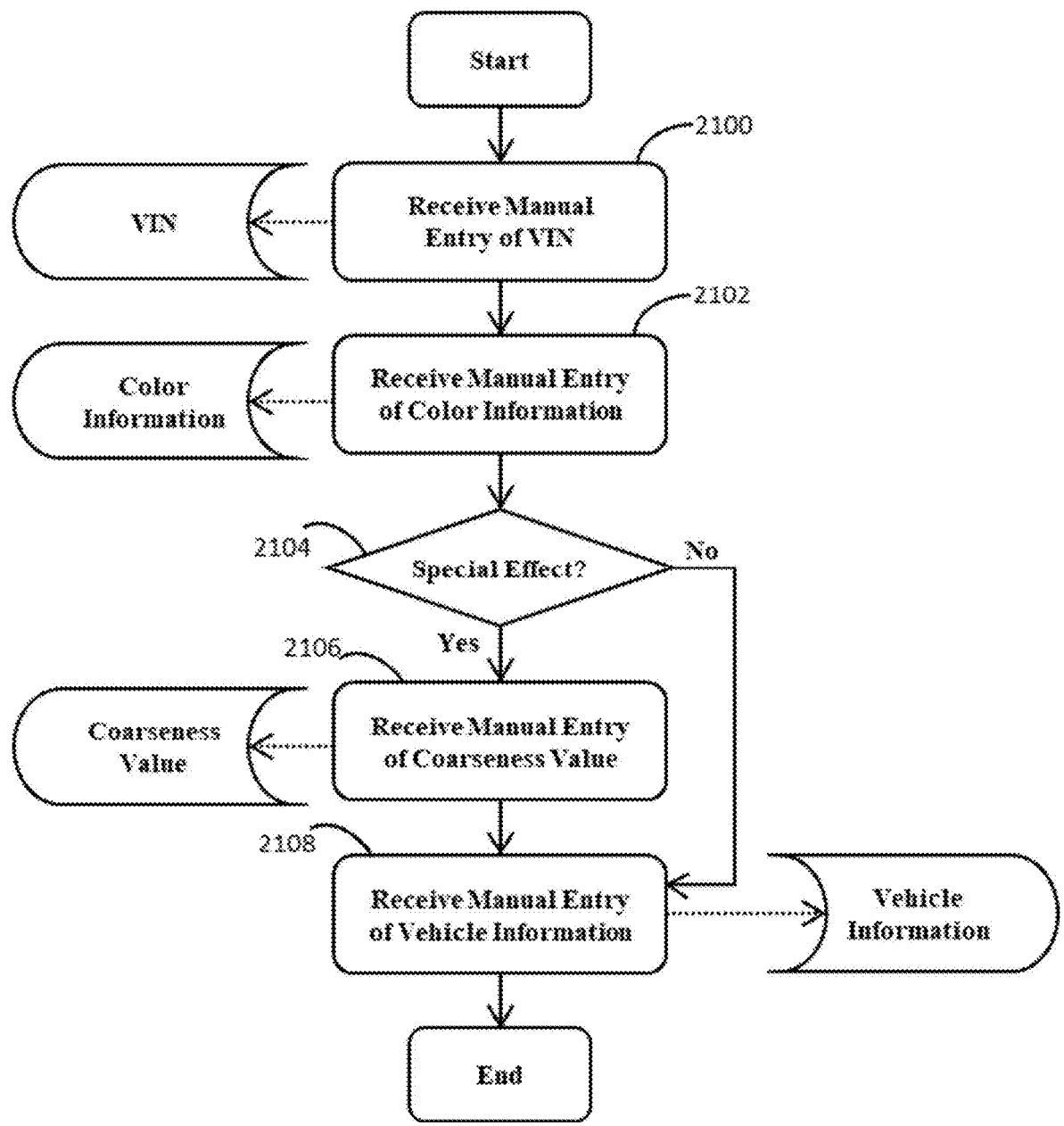
FIG. 21 is a process flow diagram of an exemplary method for receiving information manually entered by a user.

Referring back to FIG. 6, in step 614, processor 300 optionally receives information that has been manually entered by a user in response to a request for user input presented on electronic visual display 304. FIG. 21 shows an exemplary method that may be performed by processor 300 to receive the user-entered information. In step 2100, processor 300 receives a VIN for the vehicle that has been manually entered by a user. In step 2102, processor 300 receives color information for the vehicle, i.e., a description of the color (e.g., red, blue, etc.) and color effect (e.g., solid, metallic, pearlescent, Xirallic®, etc.), which has been manually entered by a user. In step 2104, processor 300 determines if the entered information includes a special effect (e.g., metallic, pearlescent, Xirallic®, etc.) and, if not, the process proceeds to step 2108. If the entered information includes a special effect, then the user determines the texture parameters for the special effect (e.g., graininess, coarseness, sparkle, etc.). For example, the user may use a physical coarseness selector to determine the coarseness value. In step 2106, processor 300 receives the texture parameters that have been manually entered by the user. Finally, in step 2108, processor receives vehicle information (e.g., the make, model, and/or model year of the vehicle) that has been manually entered by the user.

Figure 22:
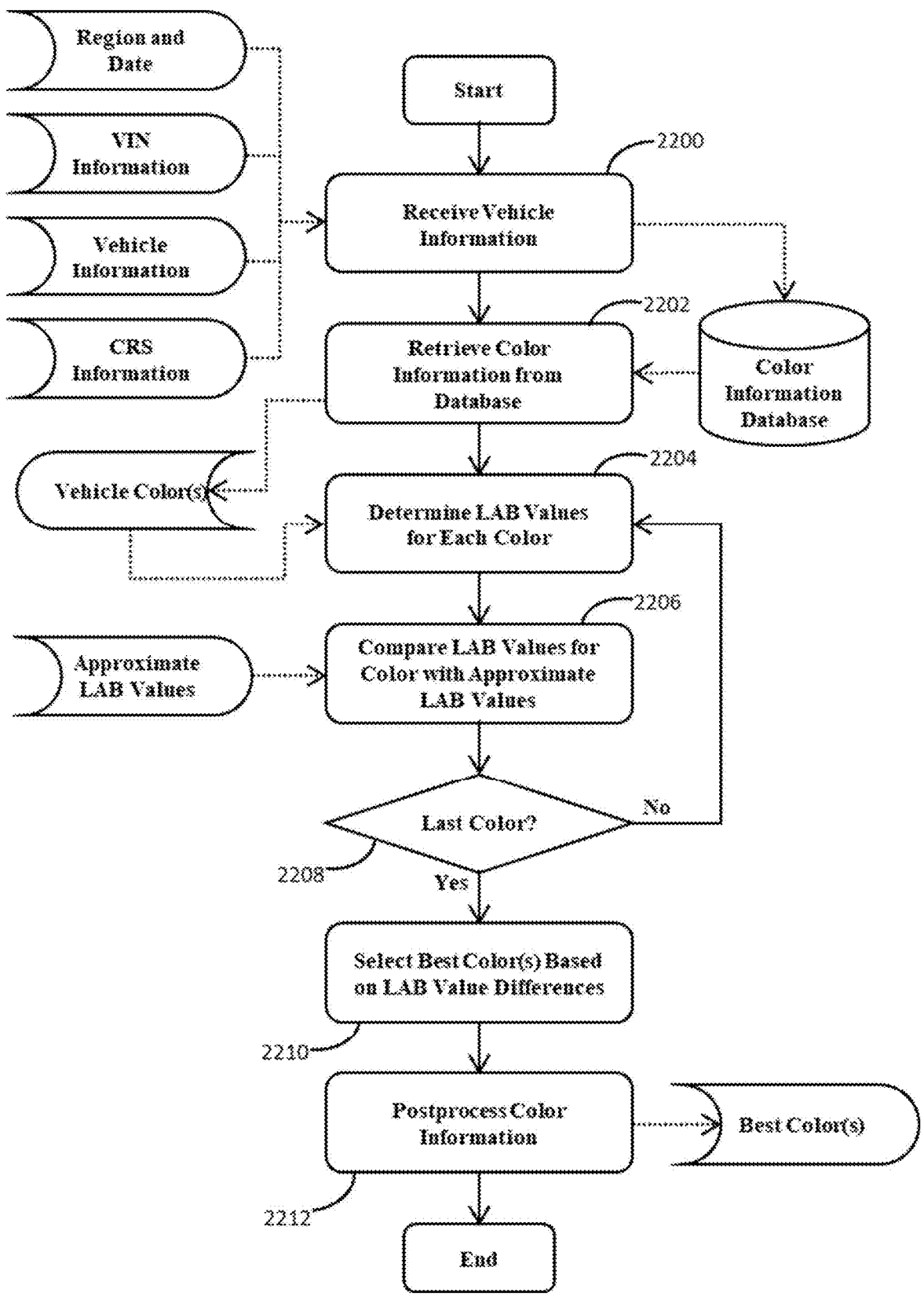
FIGS. 22 and 23 are process flow diagrams of exemplary methods for determining color information for a vehicle.
Figure 23:
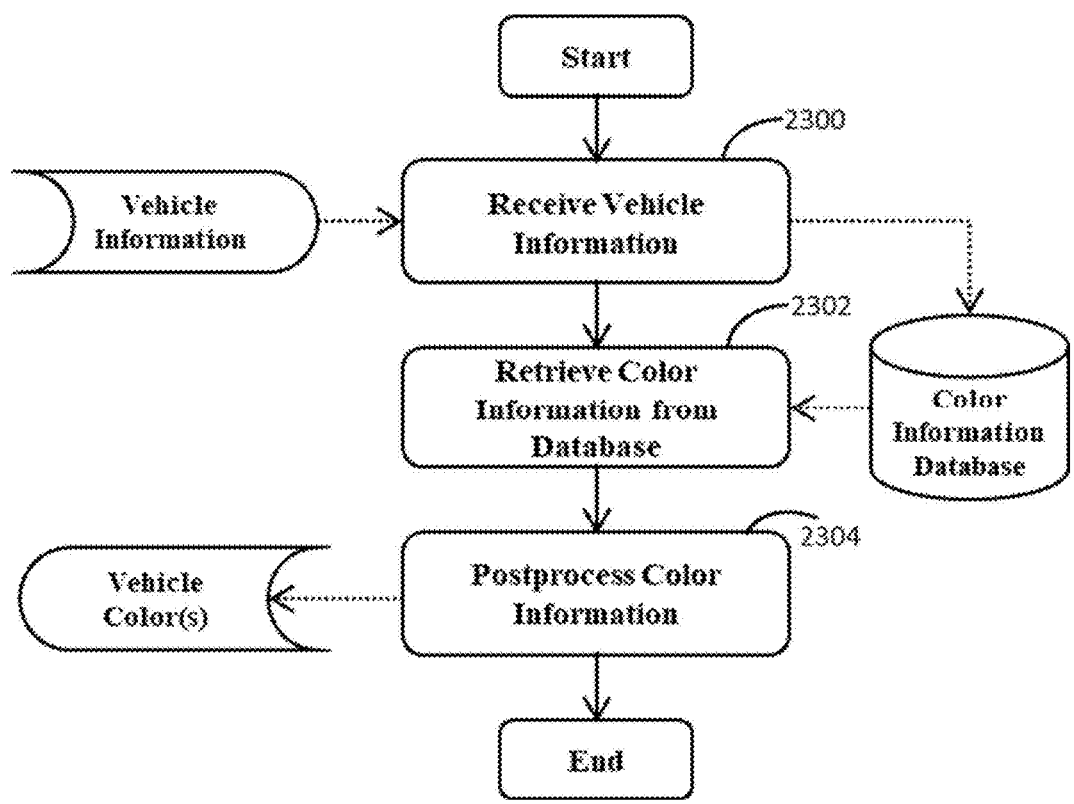

Referring back to FIG. 6, in step 616, processor 300 uses the vehicle information determined in step 612 and optionally one or more of the region determined in step 600, the CRS information received in step 604, the VIN information received in step 608, the basic color information received in step 610, and the user-entered information received in step 614, to determine the color information for the vehicle. It should be understood that the color information associated with the vehicle information provides a comprehensive list of the colors used to manufacture that particular vehicle type, and the optional information (i.e., the region, CRS information, VIN information, basic color information, and/or user-entered information) may be used to filter or exclude colors from the comprehensive list. FIGS. 22 and 23 show two exemplary methods that may be performed by processor 300 to determine the color information.

With reference to the exemplary method shown in FIG. 22, in step 2200, processor 300 uses the vehicle information determined in step 612 (i.e., the make, model, and/or model year of the vehicle), the region determined in step 600, the CRS information received in step 604, and the VIN information received in step 608, to determine color information for the vehicle. Specifically, processor 300 transmits the vehicle information, the region, the CRS information and the VIN information to server system 208, in which case server system 208 accesses color information database 210 to retrieve the color information (e.g., the color and color effect and all of the different aftermarket paint color formulas) associated with this information. In step 2202, processor 300 receives the color information from server system 208.

In step 2204, processor 300 determines the L*a*b* color values for each of the colors in the color information. In step 2206, processor 300 compares the L*a*b* color values for one of the colors with approximate L*a*b* color values, e.g., the average L*a*b* color values for the vehicle portion of the image as determined in the processes shown in FIGS. 16, 17 and 18. In step 2208, processor 300 determines if there is another color to be analyzed and, if so, the process returns to step 2204. If not, processor 300 selects one or more best colors based on the difference between the L*a*b* color values for each color and the approximate L*a*b* color values, wherein the best color(s) will be associated with the smallest differences. In step 2212, processor 300 optionally stores the color information for the best color(s) in memory (e.g., memory device 302 shown in FIG. 3 or other memory as described above).

With reference to the exemplary method shown in FIG. 23, in step 2300, processor 300 uses the vehicle information determined in step 612 (i.e., the make, model, and/or model year of the vehicle) to determine color information for the vehicle. Specifically, processor 300 transmits the vehicle information to server system 208, in which case server system 208 accesses color information database 210 to retrieve the color information (e.g., the color and color effect and all of the different aftermarket paint color formulas) associated with the vehicle information. In step 2302, processor 300 receives the color information from server system 208. In step 2304, processor 300 optionally stores the color information in memory (e.g., memory device 302 shown in FIG. 3 or other memory as described above).

Figure 24:
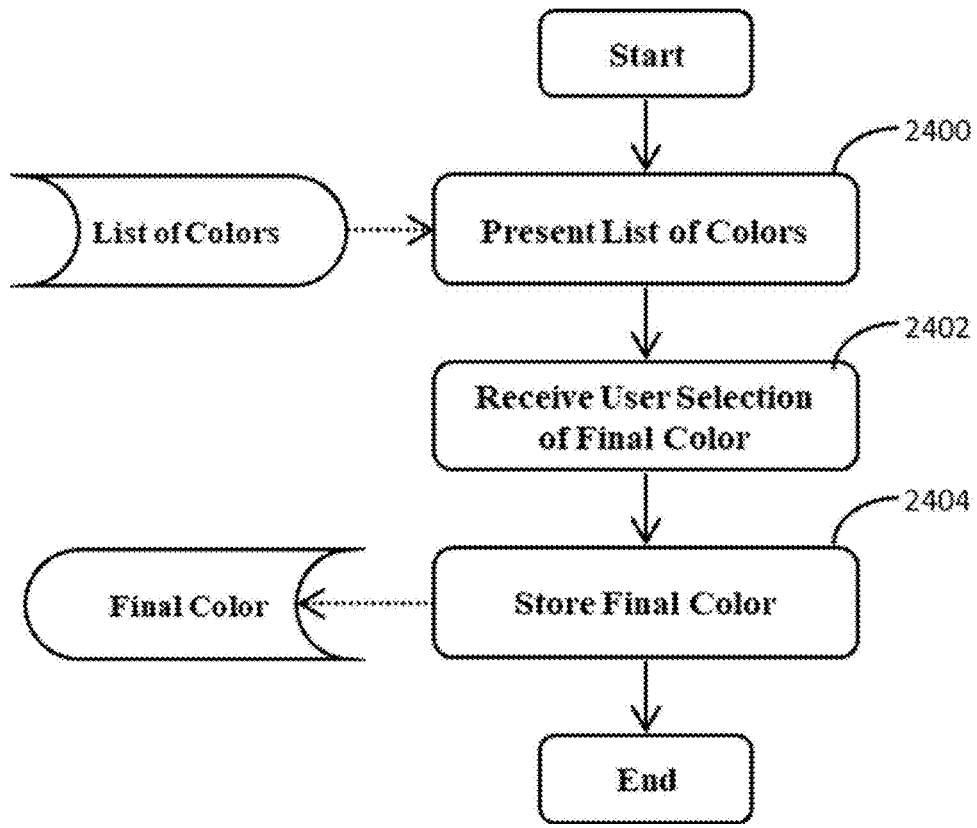
FIGS. 24, 25 and 26 are process flow diagrams of exemplary methods for presenting color results and receiving a final color selection.
Figure 25:
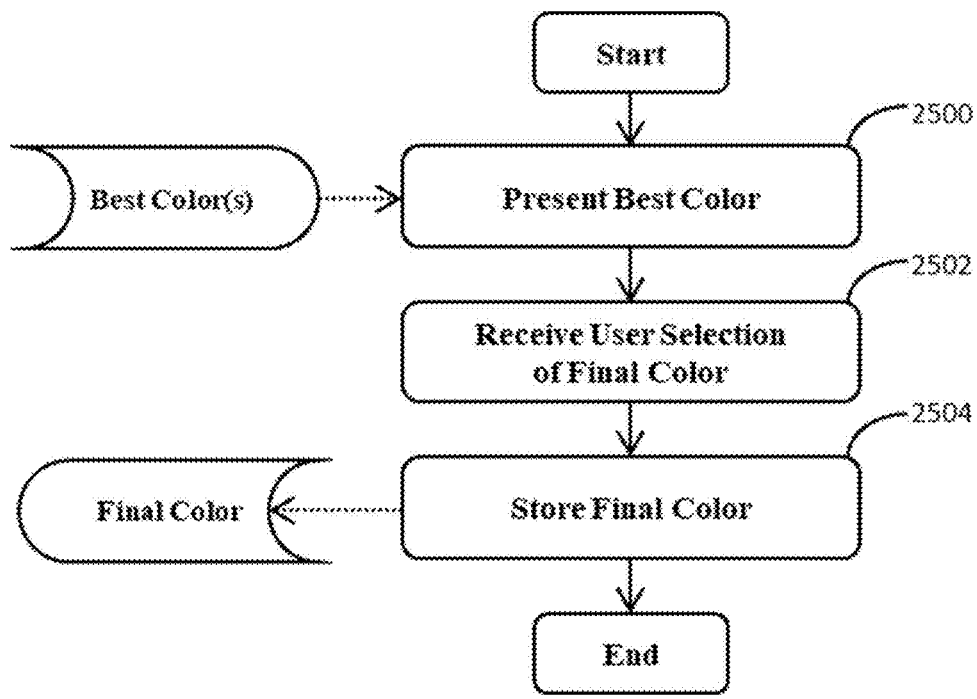
Figure 26:
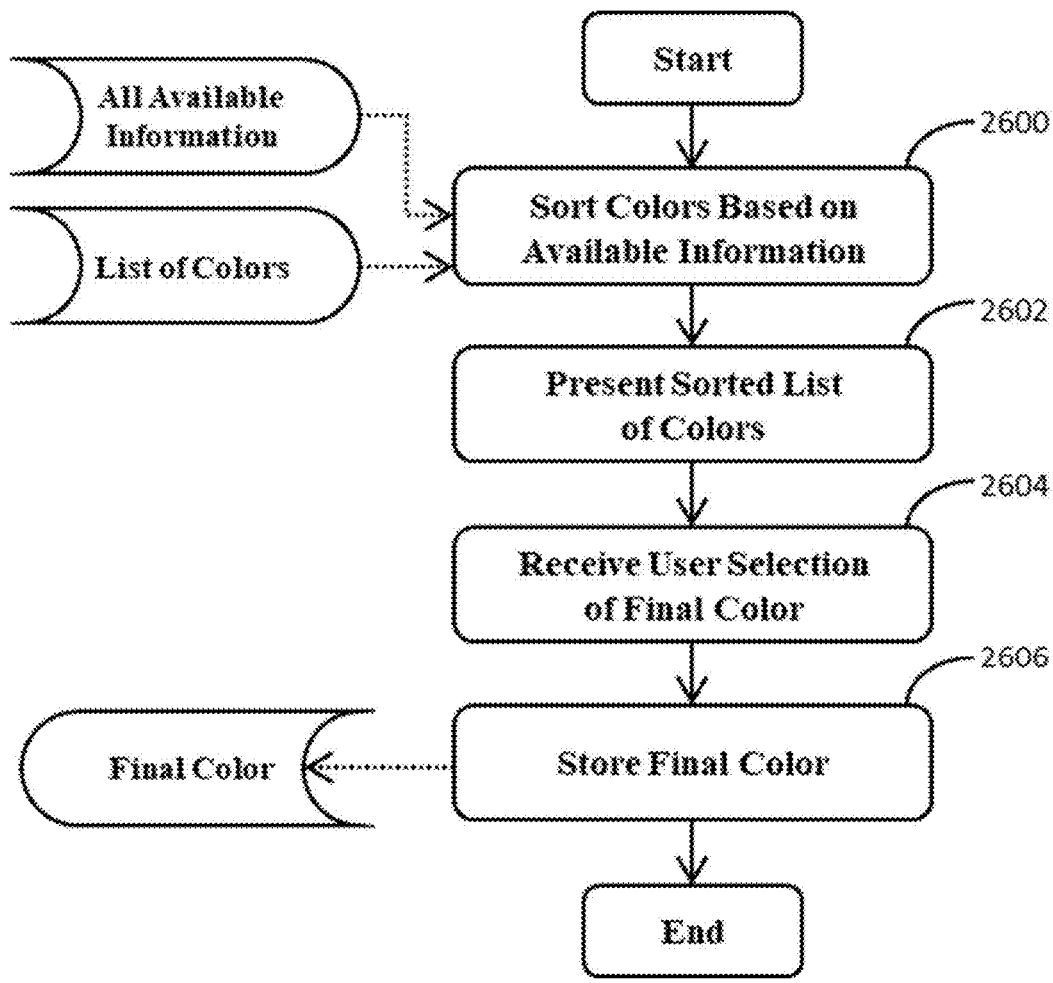

Referring back to FIG. 6, in step 618, processor 300 determines if the color information was located. If not, the process returns to step 614, in which case processor 300 requests that the user manually enter additional information that will enable determination of the color information. In step 620, if the color information is located, processor 300 presents color results on an electronic visual display, e.g., electronic visual display 304 of the smartphone shown in FIG. 3, wherein the color results comprise all or a portion of the color information determined in step 616. Then, in step 622, processor 300 receives a selection of a final color from the user. Of course, if processor 300 is able to determine the final color and associated color formula without user input, then steps 620 and 622 may be eliminated. FIGS. 24, 25 and 26 show three exemplary methods that may be performed by processor 300 to present the color results and receive the final color selection.

With reference to the exemplary method shown in FIG. 24, in step 2400, processor 300 presents a list of colors that includes all of the colors determined by the process shown in FIG. 23. The information presented for each of the colors on the list may include the color and color effect and/or the different aftermarket paint color formulas created for each color. In step 2402, processor 300 receives a final color selection from the list of colors presented to the user and, in step 2404, processor 300 optionally stores the final color information in memory (e.g., memory device 302 shown in FIG. 3 or other memory as described above).

With reference to the exemplary method shown in FIG. 25, in step 2500, processor 300 presents the best color(s) determined by the process shown in FIG. 22. The information presented for each of the best color(s) may include the color and color effect and/or the different aftermarket paint color formulas created for each color. In step 2502, processor 300 receives a final color selection from the best color(s) presented to the user. If only one best color was identified by the process shown in FIG. 22, then step 2502 will comprise a confirmation of that best color by the user. In step 2504, processor 300 optionally stores the final color information in memory (e.g., memory device 302 shown in FIG. 3 or other memory as described above).

With reference to the exemplary method shown in FIG. 26, in step 2600, processor 300 sorts the colors determined by the process shown in FIG. 23 according to one or more criteria. For example, the colors may be sorted according to the differences between a color's L*a*b* color values and the approximate L*a*b* color values, as discussed above, wherein the color with the smallest difference appears at the top of the list. As another example, the colors may be sorted based on historical information, wherein the most popular color appears at the top of the list. As yet another example, the colors may be sorted based on statistical information, wherein the color variant associated with a particular region based on a statistical analysis appears at the top of the list.

In step 2602, processor 300 presents the sorted list of colors. The information presented for each of the colors on the sorted list may include the color and color effect and/or the different aftermarket paint color formulas created for each color. In step 2602, processor 300 receives a final color selection from the list of colors presented to the user and, in step 2604, processor 300 optionally stores the final color information in memory (e.g., memory device 302 shown in FIG. 3 or other memory as described above).

Referring back to FIG. 6, in step 624, processor 300 processes the final color selection in one or more ways.

Figure 27:
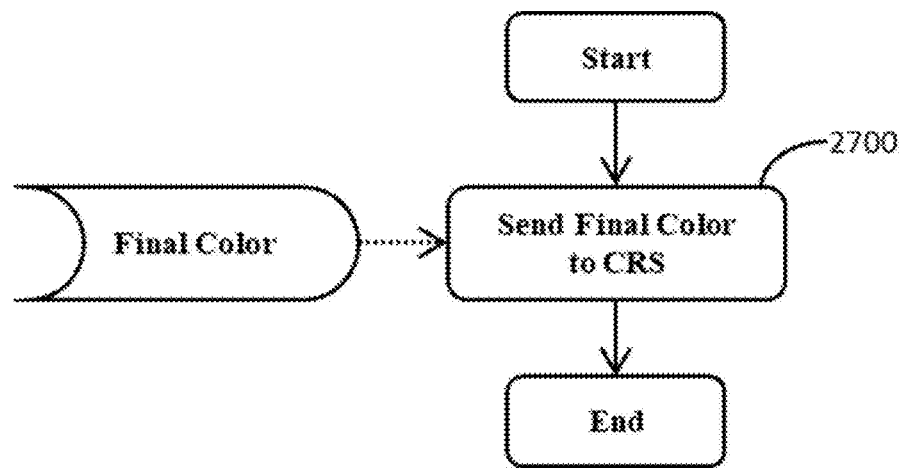
FIGS. 27, 28 and 29 are process flow diagrams of exemplary methods for processing the final color selection.
Figure 28:
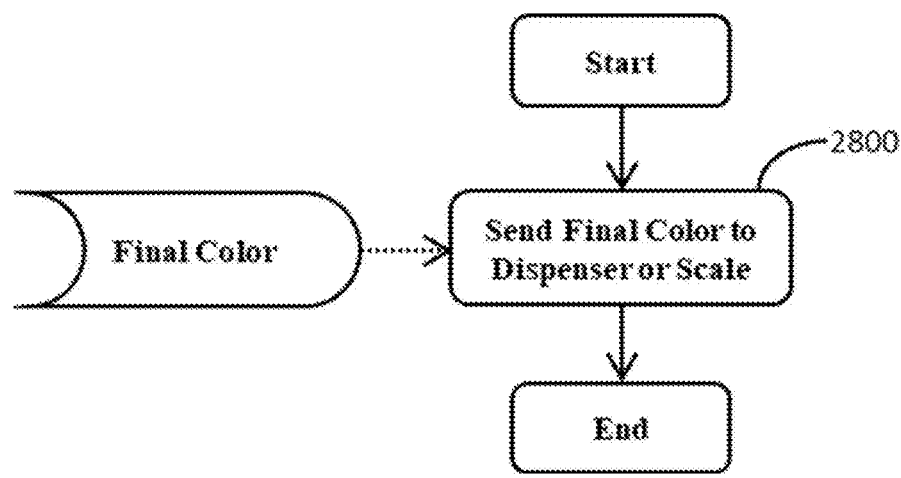
Figure 29:
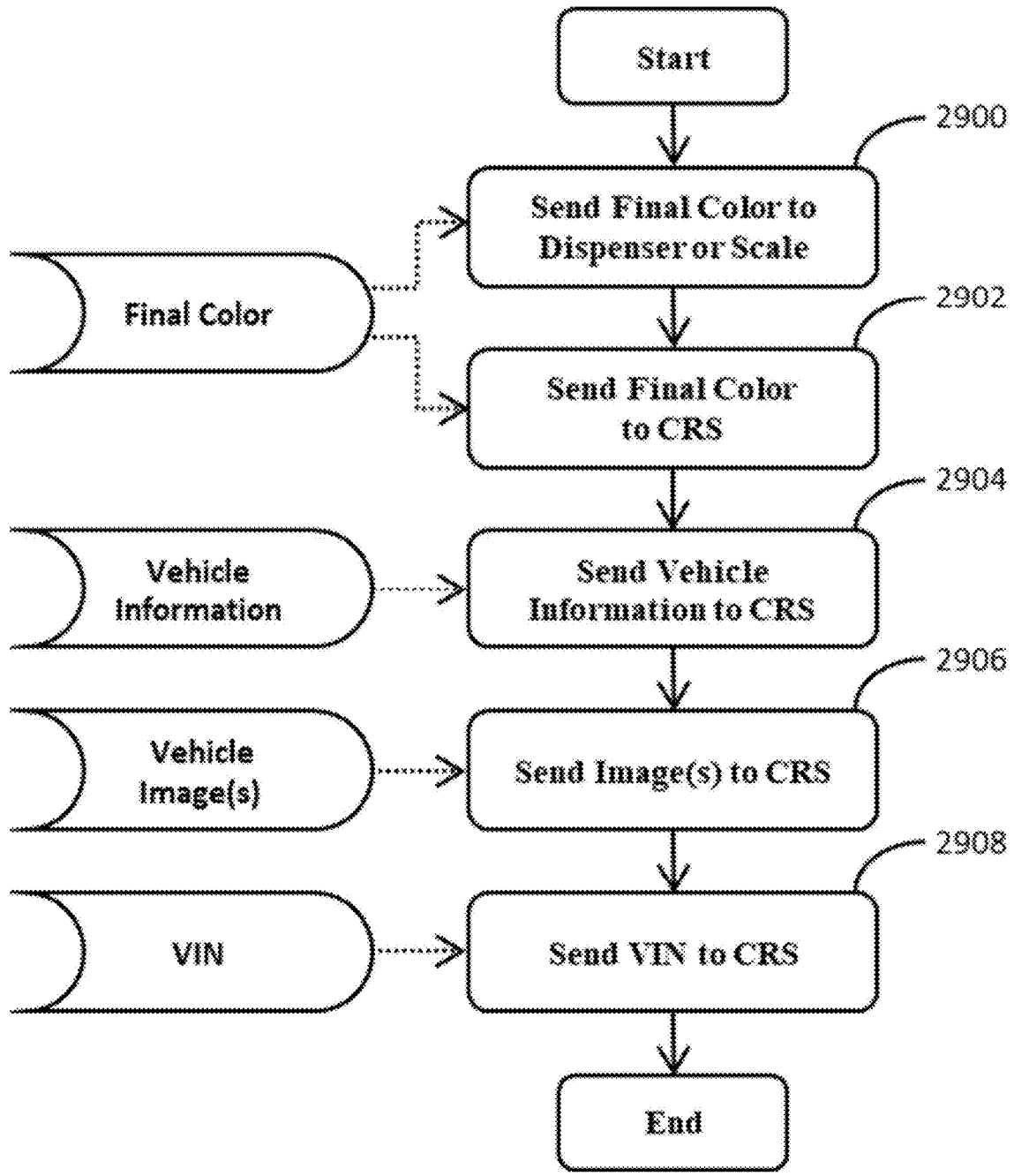

FIGS. 27, 28 and 29 show three exemplary methods that may be performed by processor 300 to process the final color selection.

With reference to the exemplary method shown in FIG. 27, in step 2700, processor 300 transmits the color information for the final color selection to color retrieval system 212 shown in FIG. 2. The color information transmitted to color retrieval system 212 preferably includes the color and color effect and associated aftermarket paint color formula for the final color selection, wherein this information becomes part of the record within color retrieval system 212.

With reference to the exemplary method shown in FIG. 28, in step 2800, processor 300 transmits the color information for the final color selection to paint dispenser or scale 214 shown in FIG. 2. The color information transmitted to dispenser or scale 214 preferably includes the color and color effect and associated aftermarket paint color formula for the final color selection, wherein the paint color formula is used to create the paint for application to the vehicle.

With reference to the exemplary method shown in FIG. 29, in step 2900, processor 300 transmits the color information for the final color selection to paint dispenser or scale 214 and, in step 2902, processor 300 transmits the color information for the final color selection to color retrieval system 212. In each case, the transmitted color information preferably includes the color and color effect and associated aftermarket paint color formula for the final color selection. In step 2904, processor 300 also transmits the vehicle information determined in step 612 of FIG. 6 to color retrieval system 212. In step 2906, processor 300 additionally transmits the vehicle images(s) received in step 602 of FIG. 6 to color retrieval system 212. Further, in step 2908, processor 300 transmits the VIN received in step 606 of FIG. 6 to color retrieval system 212.

Figure 30:
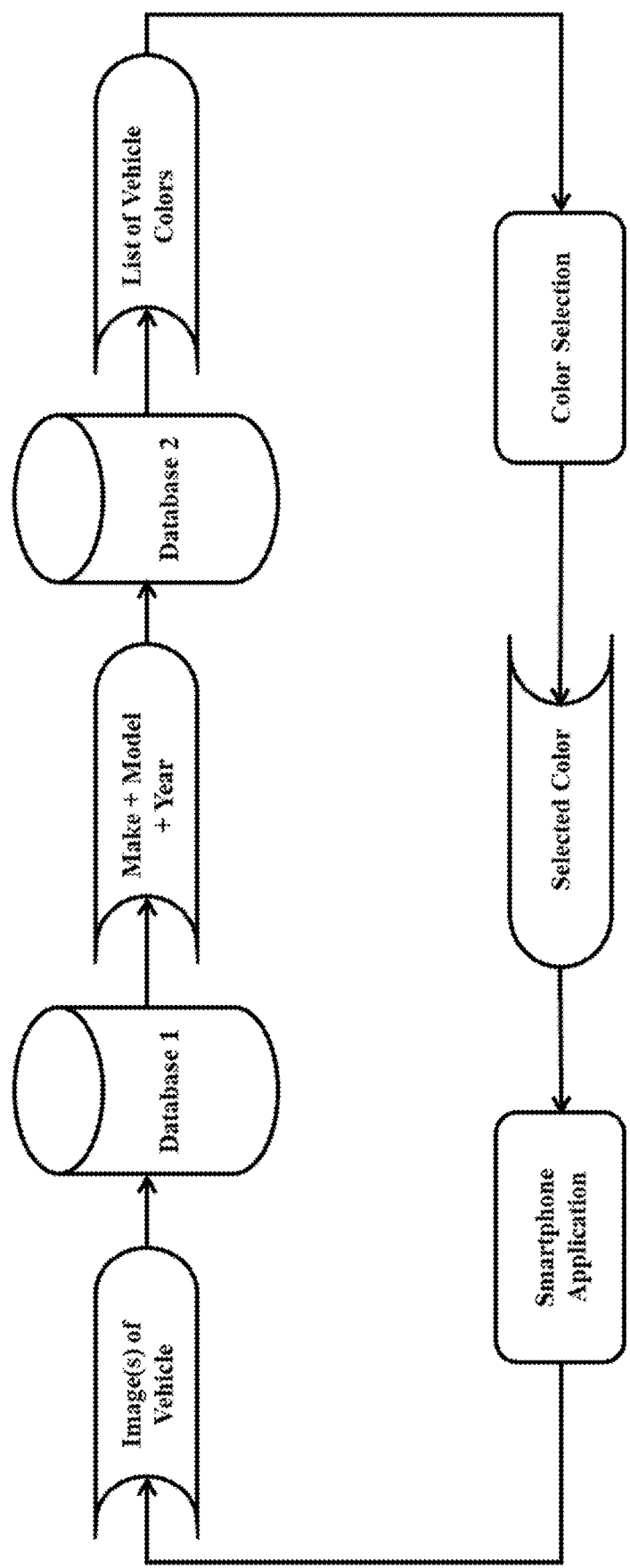
FIGS. 30-36 are process flow diagrams of exemplary automotive color matching methods performed by the computing device shown in FIG. 2, which utilize various combinations of the required and optional steps shown in FIG. 6.
Figure 31:
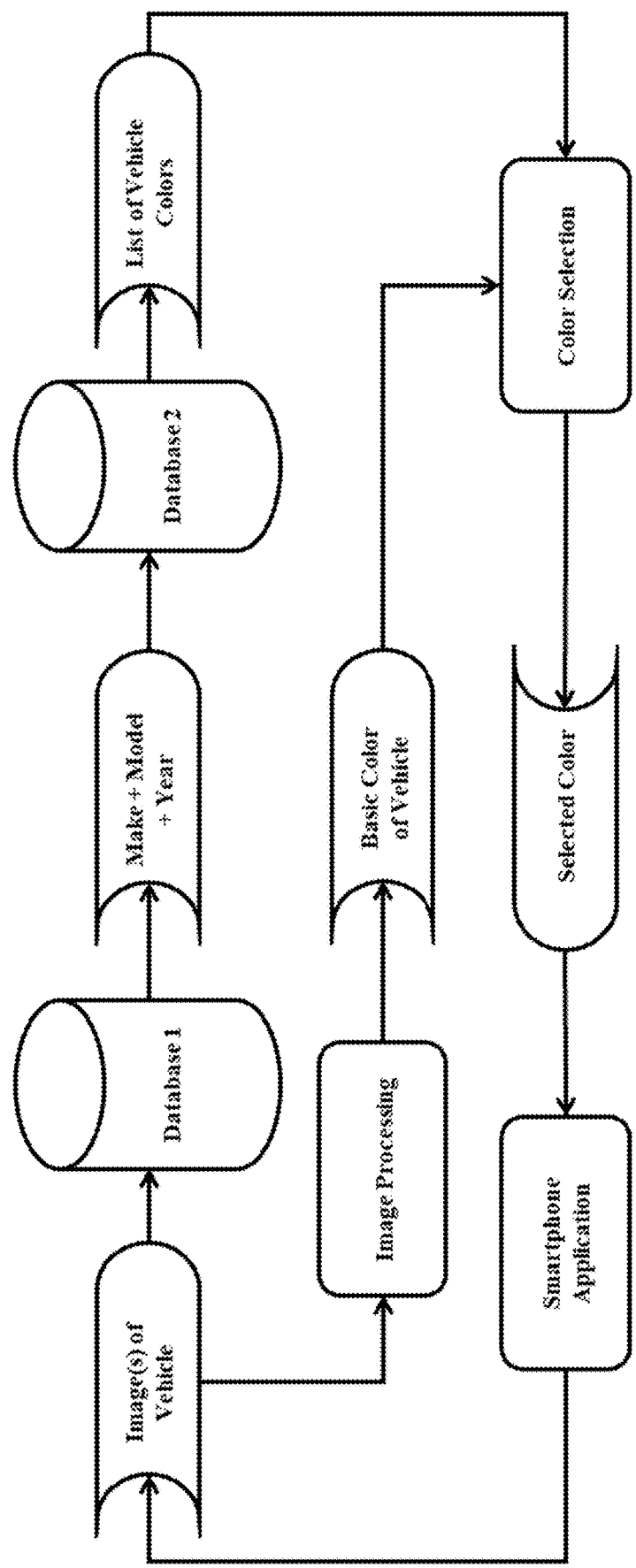
Figure 32:
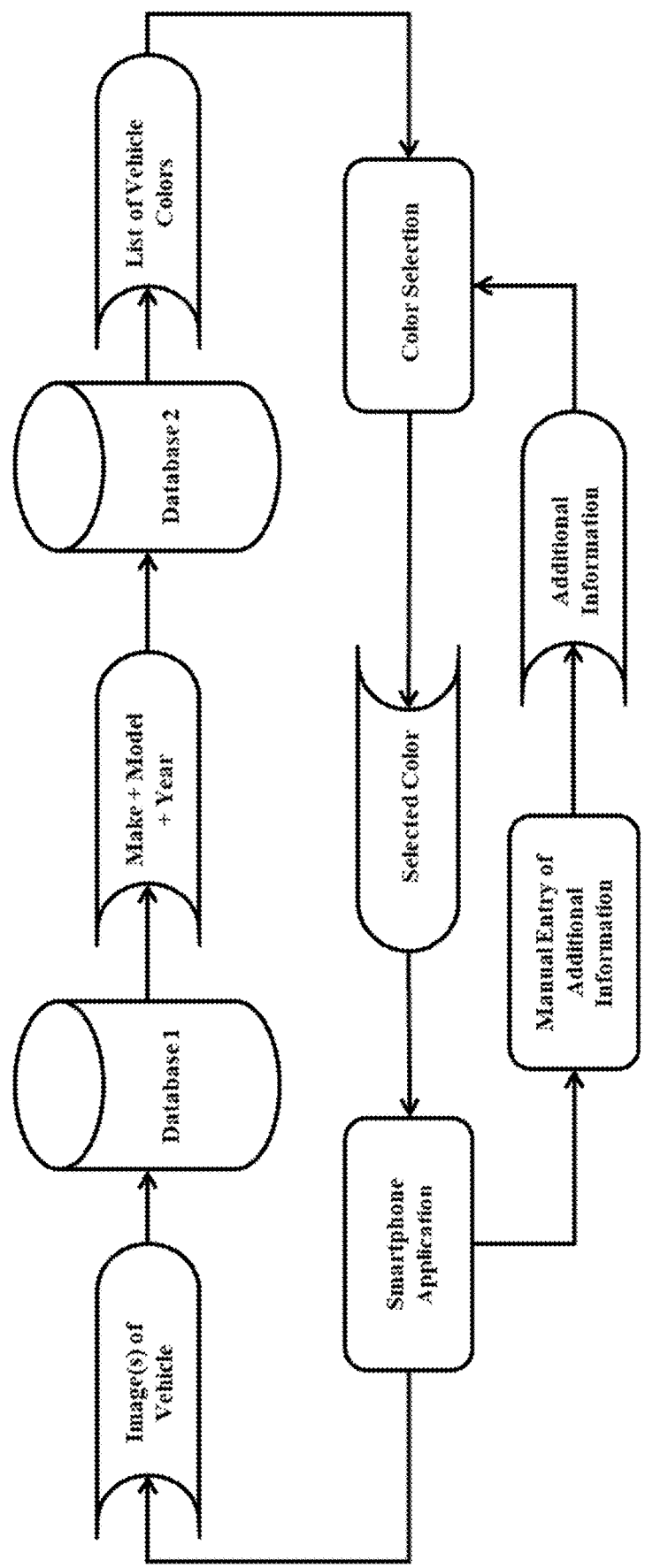
Figure 33:
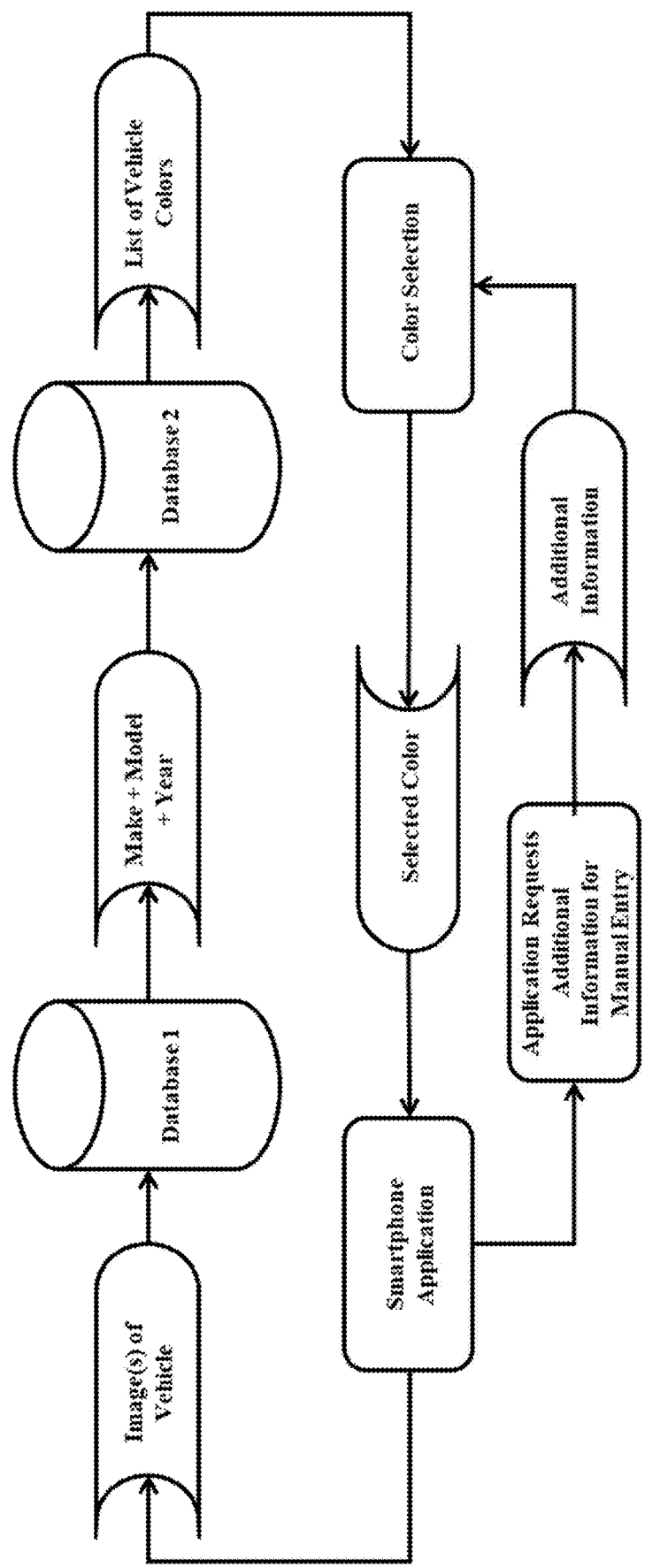
Figure 34:
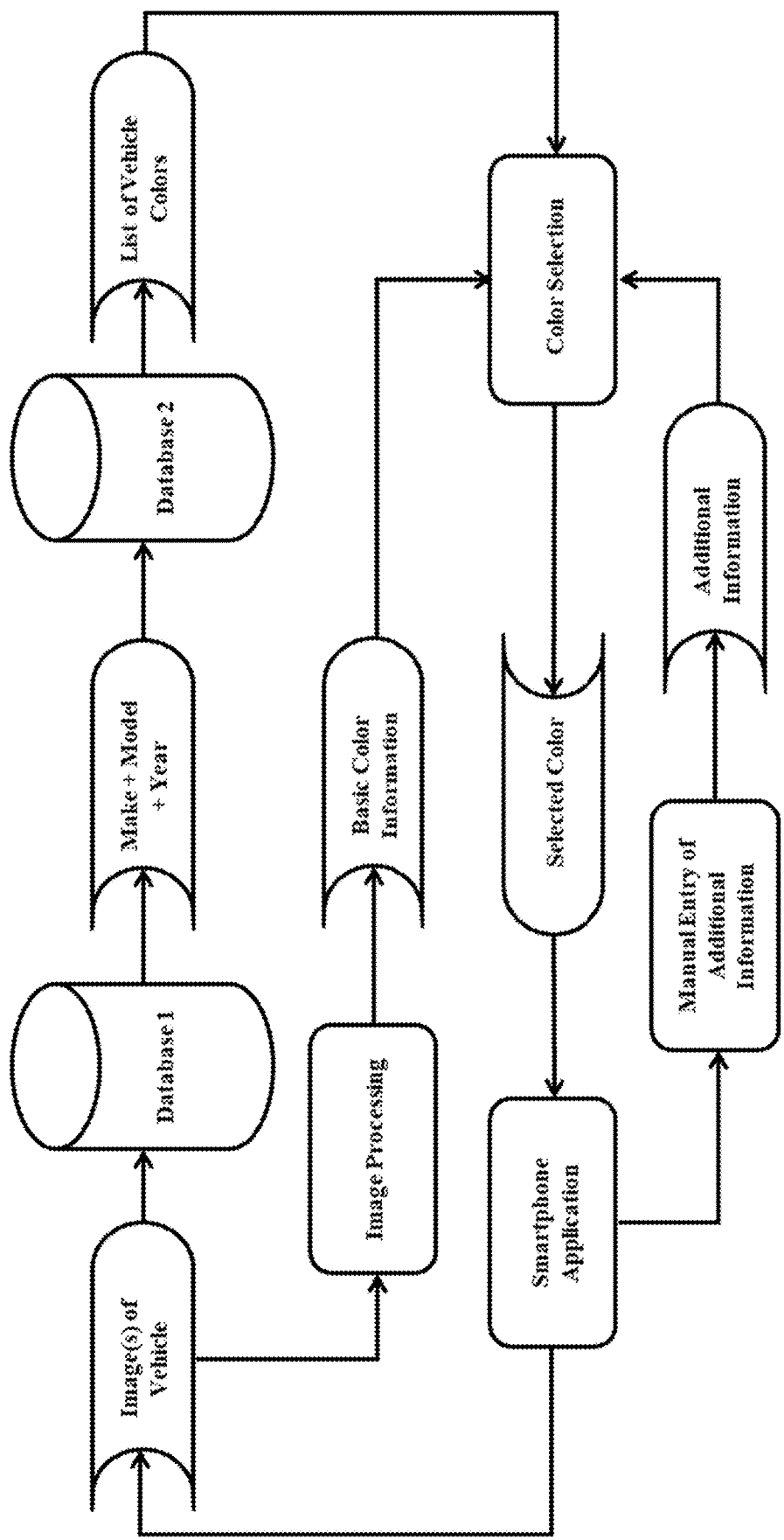
Figure 35:
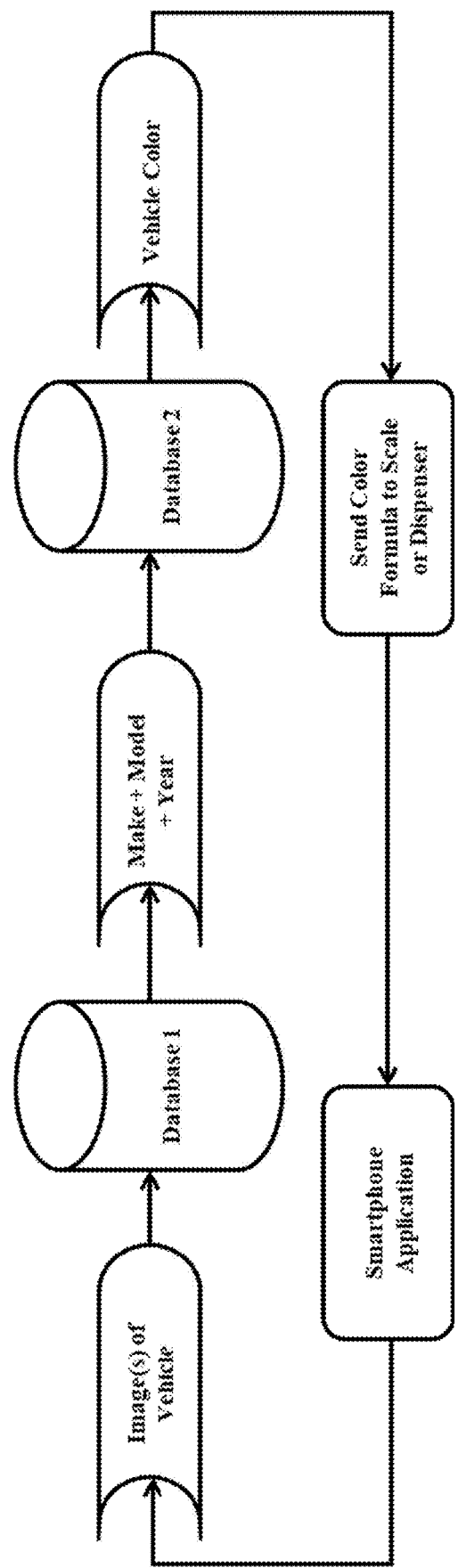

Referring back to FIG. 6, it should be understood that the various steps of the overall method may be performed in any order, provided that the information required to perform a particular step is obtained in a prior step(s). Also, various combinations of the steps shown in FIG. 6 may be performed to provide different embodiments of the present invention. For example, FIG. 30 is a process flow diagram of an exemplary automotive color matching method that includes steps 602, 612, 616, 620 and 622 of FIG. 6. FIG. 31 is a process flow diagram of an exemplary automotive color matching method that includes steps 602, 610, 612, 616, 620 and 622 of FIG. 6. FIG. 32 is a process flow diagram of an exemplary automotive color matching method that includes steps 602, 612, 614, 616, 620 and 622 of FIG. 6. In addition, FIG. 33 is a process flow diagram of an exemplary automotive color matching method that includes steps 602, 612, 614, 616, 618, 620 and 622 of FIG. 6. FIG. 34 is a process flow diagram of an exemplary automotive color matching method that includes steps 602, 610, 612, 614, 616, 620 and 622 of FIG. 6. Further, FIG. 35 is a process flow diagram of an exemplary automotive color matching method that includes steps 602, 612, 616, 620, 622 and 624 of FIG. 6.

Figure 1:
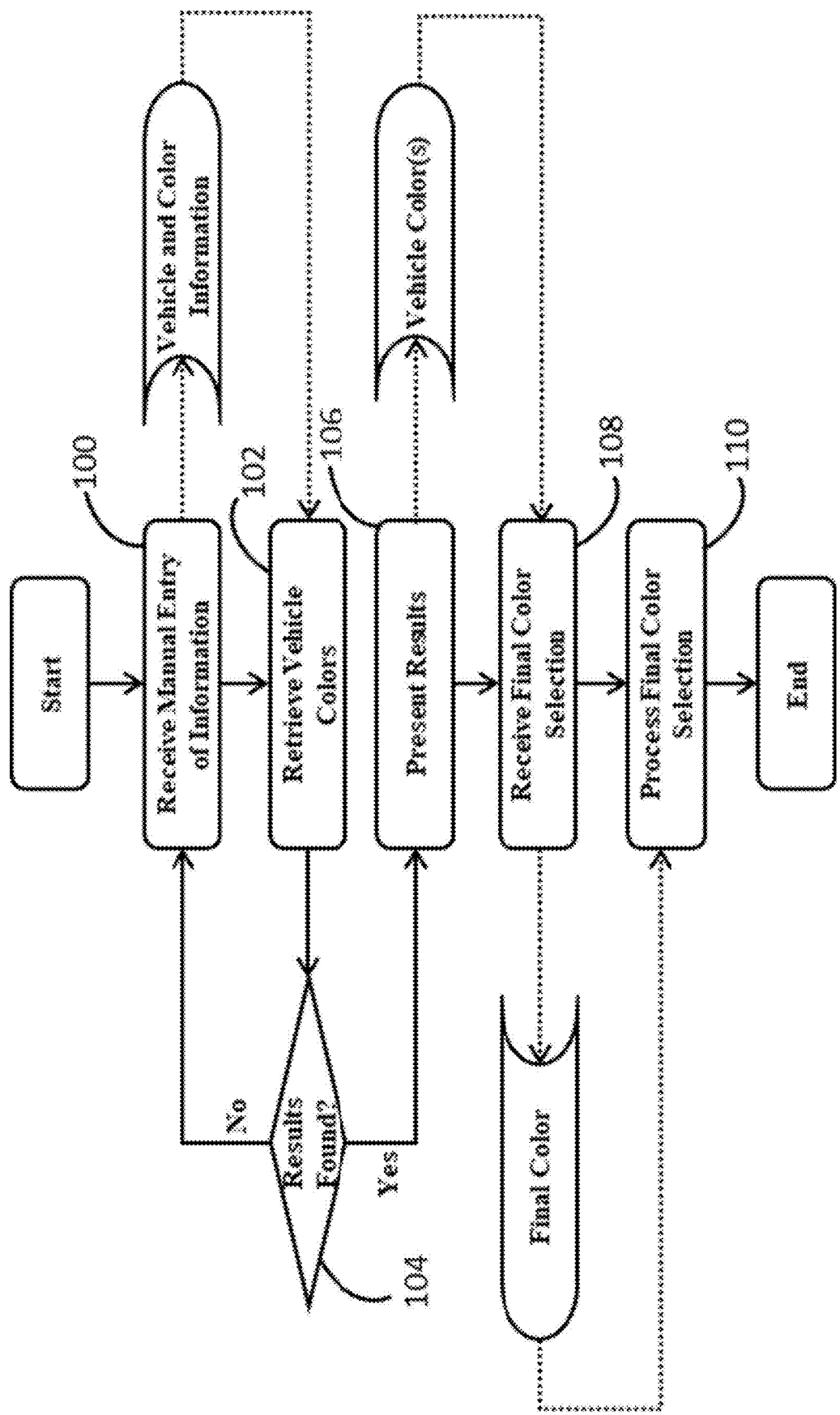
FIG. 1 is a process flow diagram of the operations performed by a conventional color retrieval system.
Figure 36:
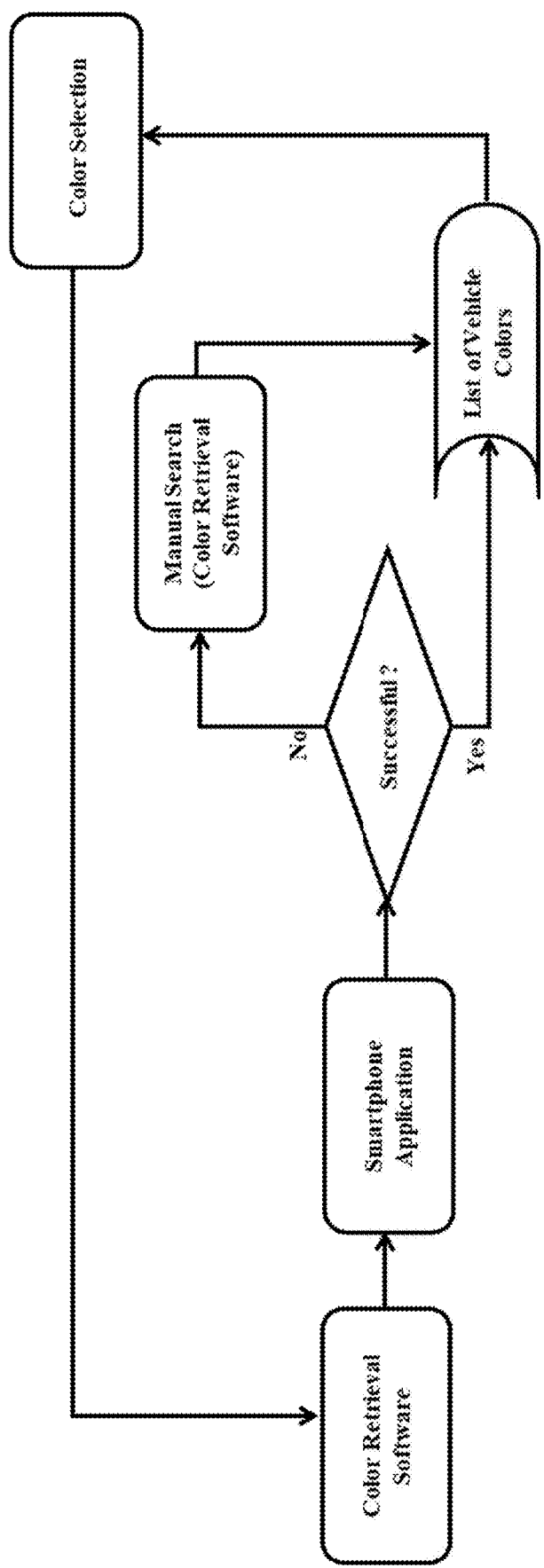

FIG. 36 is a process flow diagram of another exemplary automotive color matching method that integrates the overall method shown in FIG. 6 with a conventional color retrieval process. In this embodiment, if the color matching process of FIG. 6 is successful, then the color selection is sent to color retrieval system 212. However, if the color matching process of FIG. 6 is not successful, then a manual search for the color is performed by color retrieval system 212 in accordance with the method shown in FIG. 1.

Further, in some embodiments, the image of the vehicle or damaged portion of the vehicle is used to determine the amount of paint required for the repair, the type of repair, and the cost of repair, as known to those skilled in the art.

The automotive color matching system and method of the present invention offers many advantages compared to existing technological systems. For example, the color matching application can be implemented on hardware that is readily available to most users, such as a smartphone or other common computing devices, and thus does not require the purchase of expensive equipment. Also, operation of the computing device does not require a high level of expertise (e.g., a smartphone is easier to use than a spectrophotometer), and the computing device can be readily used within an auto body shop environment. In addition, it is common for a user to have internet access, while the body shop itself may not be online.

Further, the computing device executes a color matching application that does not require manual entry of much information and, thus, enables a fast and relatively error-free process for selecting a color formula to match the color of the vehicle's original paint finish. For example, with reference to the overall method shown in FIG. 6, the only steps that require user action are step 602 (capturing the vehicle image), optional step 606 (scanning the VIN or VIN barcode), optional step 614 (manual entry of vehicle information), and step 622 (manual selection of the final paint color). Also, it should be understood that speech recognition (2-way) could be used in place of the manual entry of information. Thus, the color matching application enables a user to capture an image of a damaged vehicle and, with little or no additional action by the user, the color formula is immediately transmitted to a paint scale or dispenser for application of paint to the vehicle. Other advantages of the present invention will be apparent to those skilled in the art.

III. General Information

In this disclosure, the use of any and all examples or exemplary language (e.g., "for example" or "as an example") is intended merely to better describe the invention and does not pose a limitation on the scope of the invention. No language in the disclosure should be construed as indicating any non-claimed element essential to the practice of the invention.

Also, the use of the terms "comprises," "comprising," or any other variation thereof, are intended to cover a non-exclusive inclusion, such that a system, device, or method that comprises a list of elements does not include only those elements, but may include other elements not expressly listed or inherent to such system, device, or method.

Finally, while the present invention has been described and illustrated hereinabove with reference to various exemplary embodiments, it should be understood that various modifications could be made to these embodiments without departing from the scope of the invention. Therefore, the present invention is not to be limited to the specific network elements or methodologies of the exemplary embodiments, except insofar as such limitations are included in the following claims.

What is claimed and desired to be secured by Letters Patent is as follows:

1. A non-transitory computer readable medium storing instructions that, when executed by a processor of a computing device, cause the processor to perform a plurality of operations comprising:

receiving at least one digital image of a vehicle captured by a camera in communication with the processor;

determining vehicle information associated with the digital image of the vehicle; and determining color information associated with the vehicle information, wherein a final paint color selected from a plurality of colors in the color information is used for application of paint to the vehicle;

determining color values for each of the colors in the color information;

analyzing the digital image of the vehicle to identify color values for a basic color of the vehicle; and selecting color results based on a difference between the color values for each of the colors in the color information and the color values for the basic color of the vehicle.

2. The non-transitory computer readable medium of claim 1, wherein the vehicle information comprises a make and a model of the vehicle.

3. The non-transitory computer readable medium of claim 2, wherein the vehicle information further comprises a model year of the vehicle.

4. The non-transitory computer readable medium of claim 1, wherein the color information comprises a color formula for each of the colors.

5. The non-transitory computer readable medium of claim 1, wherein determining the vehicle information comprises accessing a vehicle information database to retrieve the vehicle information associated with the digital image of the vehicle.

6. The non-transitory computer readable medium of claim 1, wherein determining the vehicle information comprises submitting the digital image of the vehicle to a search engine and receiving the vehicle information located by the search engine.

7. The non-transitory computer readable medium of claim 1, wherein determining the color information comprises accessing a color information database to retrieve the color information associated with the vehicle information.

8. The non-transitory computer readable medium of claim 1, wherein the operations further comprise:

receiving global positioning system (GPS) information from a GPS receiver in communication with the computing device; and ascertaining a region of the vehicle from the GPS information;

wherein determining the color information comprises accessing a color information database to retrieve the color information associated with the vehicle information and the region of the vehicle.

9. The non-transitory computer readable medium of claim 1, wherein the operations further comprise:

receiving a vehicle identification number (VIN) for the vehicle; and determining VIN information based on the VIN;

wherein determining the color information comprises accessing a color information database to retrieve the color information associated with the vehicle information and the VIN information.

10. The non-transitory computer readable medium of claim 9, wherein receiving the VIN comprises receiving a digital image of the VIN captured by the camera and processing the digital image of the VIN using optical character recognition to determine the VIN.

11. The non-transitory computer readable medium of claim 9, wherein receiving the VIN comprises scanning a VIN barcode to determine the VIN.

12. The non-transitory computer readable medium of claim 9, wherein receiving the VIN comprises receiving the VIN as manually entered by a user.

13. The non-transitory computer readable medium of claim 9, wherein receiving the VIN comprises receiving the VIN from a color retrieval system.

14. The non-transitory computer readable medium of claim 9, wherein determining the VIN information comprises accessing a VIN database to retrieve the VIN information associated with the VIN, wherein the VIN information comprises one or both of additional vehicle information and additional color information for the vehicle.

15. The non-transitory computer readable medium of claim 9, wherein determining the VIN information comprises (a) submitting the VIN to a VIN decoder and (b) receiving the VIN information located by the VIN decoder, wherein the VIN information comprises additional vehicle information for the vehicle.

16. The non-transitory computer readable medium of claim 1, wherein the operations further comprise:

receiving one or both of additional vehicle information and additional color information for the vehicle from a color retrieval system (CRS);

wherein determining the color information comprises accessing a color information database to retrieve the color information associated with the vehicle information and the CRS information.

17. The non-transitory computer readable medium of claim 1, wherein the operations further comprise:

receiving one or both of additional vehicle information and additional color information as manually entered by a user;

wherein determining the color information comprises accessing a color information database to retrieve the color information associated with the vehicle information and the user-entered information.

18. The non-transitory computer readable medium of claim 1, wherein the digital image of the vehicle includes a color reference template that is used to obtain the color values for the basic color of the vehicle.

19. The non-transitory computer readable medium of claim 1, wherein the operations further comprise:

presenting color results comprising all or a portion of the colors in the color information; and receiving a selection of the final paint color for the vehicle from the color results.

20. The non-transitory computer readable medium of claim 19, wherein the final paint color is selected from the presented color results by a user.

21. The non-transitory computer readable medium of claim 19, wherein the operations further comprise determining a best color from the colors in the color information, wherein the color results comprise the best color, and wherein the final paint color is selected via confirmation of the best color by a user.

22. The non-transitory computer readable medium of claim 1, wherein the operations further comprise transmitting a color formula for the final paint color to a dispenser or a scale.

23. The non-transitory computer readable medium of claim 1, wherein the operations further comprise transmitting a color formula for the final paint color to a color retrieval system.

24. The non-transitory computer readable medium of claim 23, wherein the operations further comprise transmitting one or both of the digital image of the vehicle and the vehicle information to the color retrieval system.

25. The non-transitory computer readable medium of claim 1, wherein the computing device comprises one of a smartphone, a personal computer, a laptop computer, a personal digital assistant, a personal computing tablet, a smart watch, a wearable device, and smart glasses.

\* \* \* \* \*